(12) United States Patent
Gilman

(10) Patent No.: US 10,975,565 B2
(45) Date of Patent: *Apr. 13, 2021

(54) SUPPORT FOR EMBEDDING OBJECT IN CONCRETE

(71) Applicant: Gilman Construction Solutions, LLC, San Diego, CA (US)

(72) Inventor: Andrew Gilman, San Diego, CA (US)

(73) Assignee: Gilman Construction Solutions, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,946

(22) Filed: Jan. 24, 2019

(65) Prior Publication Data

US 2019/0169835 A1    Jun. 6, 2019

Related U.S. Application Data

(63) Continuation of application No. 15/990,440, filed on May 25, 2018, now abandoned, which is a continuation of application No. 15/587,692, filed on May 5, 2017, now abandoned, which is a continuation-in-part of application No. 15/181,155, filed on Jun. 13, 2016, now Pat. No. 9,677,276.

(60) Provisional application No. 62/197,052, filed on Jul. 26, 2015.

(51) Int. Cl.
| | |
|---|---|
| *E04B 1/41* | (2006.01) |
| *F16M 11/32* | (2006.01) |
| *F16M 11/28* | (2006.01) |
| *E04C 5/16* | (2006.01) |
| *E04C 5/20* | (2006.01) |

(52) U.S. Cl.
CPC ............... *E04B 1/41* (2013.01); *E04C 5/168* (2013.01); *E04C 5/20* (2013.01); *F16M 11/28* (2013.01); *F16M 11/32* (2013.01)

(58) Field of Classification Search
CPC ............ E04C 5/16; E04C 5/167; E04C 5/168
See application file for complete search history.

(56) References Cited

U.S. PATENT DOCUMENTS

| | | | |
|---|---|---|---|
| 1,264,189 | A | 4/1918 | Keator |
| 3,579,938 | A | 5/1971 | Hanson |
| 4,141,310 | A | 2/1979 | Rich, Jr. |
| 5,333,423 | A | 8/1994 | Propst |
| 5,590,494 | A | 1/1997 | Miller |

(Continued)

FOREIGN PATENT DOCUMENTS

| | | |
|---|---|---|
| KR | 2012 0108077 A | 10/2012 |
| RU | 2104414 C1 | 2/1998 |

(Continued)

*Primary Examiner* — Beth A Stephan
(74) *Attorney, Agent, or Firm* — Knobbe Martens Olson & Bear LLP

(57) ABSTRACT

A system for supporting and holding in place an object (for example and not by way of limitation, anchor bolts, steel plates and the like) to be embedded in concrete. A device having a shaft and a tower can be used to support the object, by inserting the shaft into an opening in the tower and rotatably locking the shaft in place at the desired height, an embed can be supported in the desired position. Concrete can be poured around the support to embed the object at the desired position within the concrete.

15 Claims, 21 Drawing Sheets

(56) References Cited

U.S. PATENT DOCUMENTS

| | | | |
|---|---|---|---|
| 5,595,039 A | 1/1997 | Lowery | |
| 5,603,187 A | 2/1997 | Merrin et al. | |
| 5,641,256 A | 6/1997 | Gundy | |
| 5,791,096 A | 8/1998 | Chen | |
| 6,202,369 B1 | 3/2001 | Partee et al. | |
| 6,206,613 B1 | 3/2001 | Elkins | |
| 6,350,093 B1 | 2/2002 | Petersen et al. | |
| 6,536,717 B2 | 3/2003 | Parker | |
| 6,722,097 B2 | 4/2004 | Haslem et al. | |
| 6,964,115 B2 | 11/2005 | Kim | |
| 7,610,728 B1 | 11/2009 | Manocchia | |
| 9,222,251 B2 | 12/2015 | Espinosa | |
| 9,677,276 B2 * | 6/2017 | Gilman | E04C 5/168 |
| 9,702,139 B2 | 7/2017 | Espinosa | |
| 2002/0148173 A1 | 10/2002 | Kugler | |
| 2003/0033760 A1 | 2/2003 | Rogers et al. | |
| 2004/0035064 A1 | 2/2004 | Kugler et al. | |
| 2004/0088945 A1 | 5/2004 | Owen | |
| 2004/0261329 A1 | 12/2004 | Kugler et al. | |
| 2008/0028718 A1 | 2/2008 | Erickson et al. | |
| 2009/0173018 A1 | 7/2009 | Buzon | |
| 2010/0050457 A1 | 3/2010 | Knight, III et al. | |
| 2011/0192111 A1 | 8/2011 | White et al. | |
| 2013/0067849 A1 | 3/2013 | Espinosa | |

FOREIGN PATENT DOCUMENTS

| | | |
|---|---|---|
| SU | 1618908 A1 | 1/1991 |
| WO | WO 2006/078208 A1 | 7/2006 |
| WO | WO 2012/107442 A1 | 8/2012 |

* cited by examiner

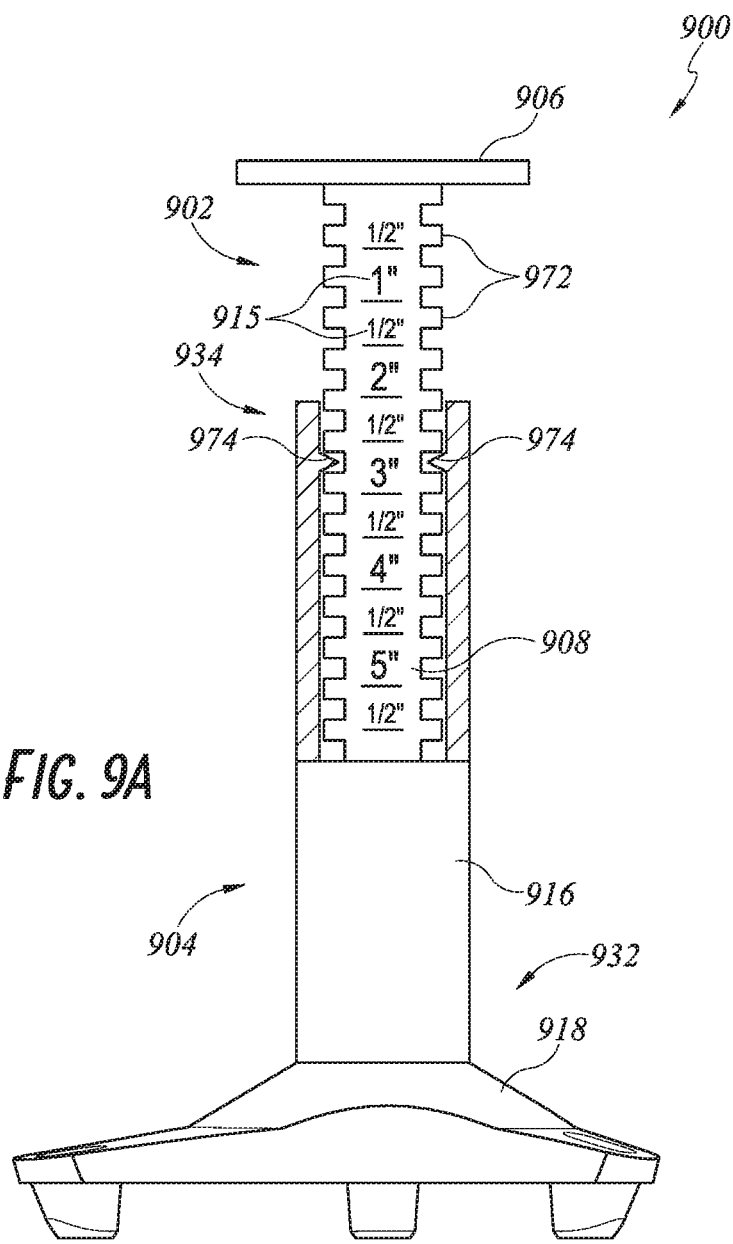

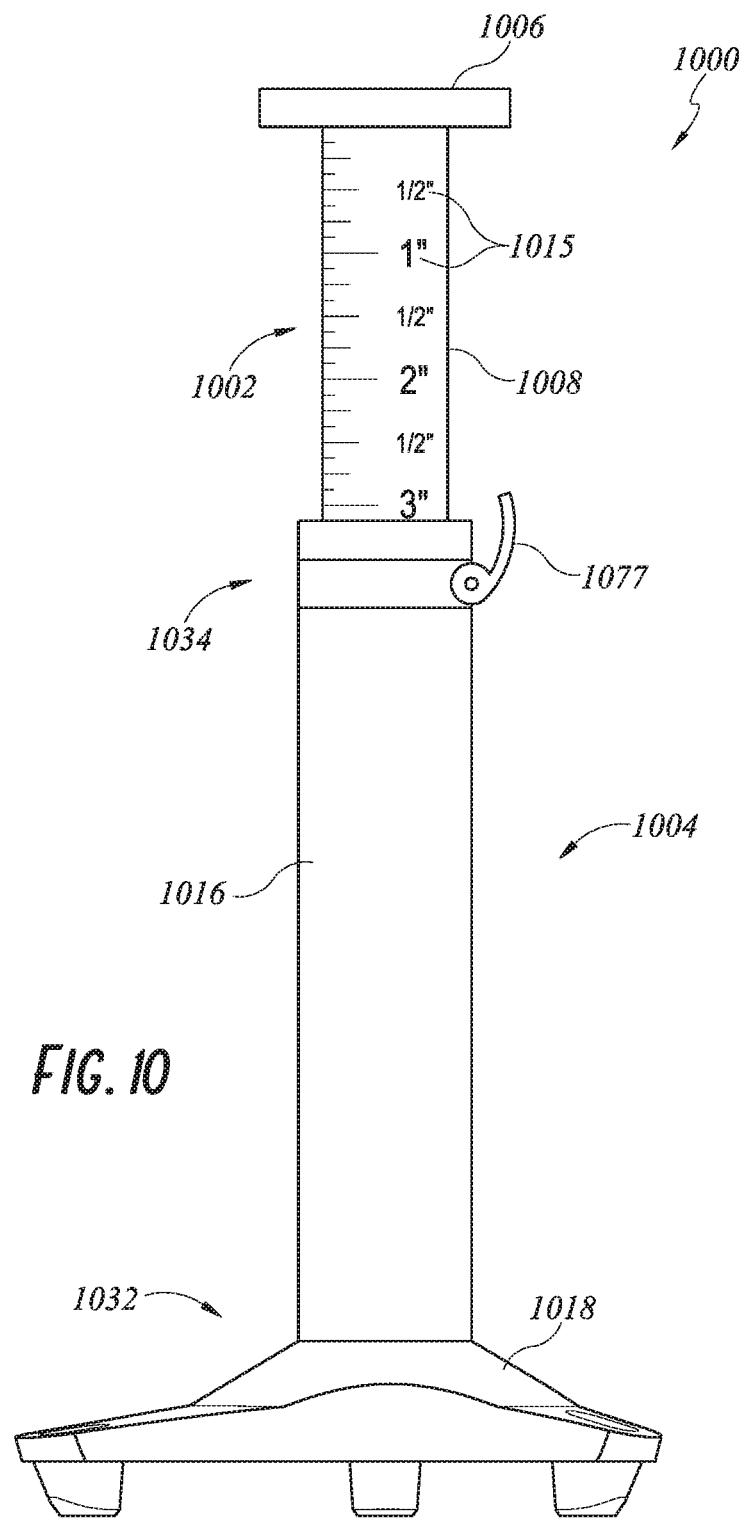

SUPPORT FOR EMBEDDING OBJECT IN CONCRETE

INCORPORATION BY REFERENCE OF PRIORITY APPLICATIONS

Any and all applications for which a foreign or domestic priority claim is identified in the Application Data Sheet as filed with the present application are hereby incorporated by reference under 37 CFR 1.57. This Application is a continuation of U.S. application Ser. No. 15/990,440, filed May 25, 2018, which is a continuation of U.S. application Ser. No. 15/587,692, filed May 5, 2017, which is a continuation-in-part of U.S. application Ser. No. 15/181,155 filed Jun. 13, 2016, which claims the benefit of priority of U.S. Provisional Application No. 62/197,052, filed Jul. 26, 2015, the entire contents of which are herein incorporated by reference.

BACKGROUND

The present invention relates generally to tools used to embed objects, such as steel plates, door closers, electrical boxes, structural embeds, anchor bolts, forms, and the like into concrete slabs.

SUMMARY

Embodiments of the present invention provide a system for supporting and holding in place an object (for example and not by way of limitation, anchor bolts, steel plates and the like) to be embedded in concrete. Embodiments of the present invention significantly reduce the amount of time and materials required to install embeds by only requiring the contractor to attach the embed to a device in accordance with embodiments of the present invention, set the device to the desired height, install, and pour the concrete. There is no set up or clean up required, nor are there wasted materials or labor after the embed has been cast.

In one aspect a support described herein comprises a support device comprising: a shaft, the shaft comprising: a rod; a platform attached to a first end of the rod; a first thread disposed along at least a portion of the rod; and a tower having an interior surface, the interior surface surrounding an opening in a first end of the tower, the opening configured to receive the rod, wherein the interior surface comprises a second thread formed on at least a portion of the interior surface and adapted to engage the first thread.

In some embodiments, the tower further comprises a securing element configured to releasably secure the rod within the tower.

In some embodiments, the first thread is formed radially around an outer surface of the rod.

In some embodiments, the platform has a pilot hole formed therein.

In some embodiments, the first thread is discontinuous around an external surface of the shaft.

In some embodiments, the tower comprises a retention element disposed on an exterior of the tower.

In some embodiments, the first thread is configured to rotatably engage the second thread.

In some embodiments, the shaft further comprises a plurality of measurement indicators thereon, the measurement indicators indicating the distance from a second end of the tower to a top surface of the platform.

In some embodiments, the tower further comprises a base connected to a second end of the tower, the base comprising a plurality of legs extending radially from a central axis of the tower, the legs being formed having throughholes therein.

In some embodiments, the support further comprises an attachment plate, the attachment plate configured to attach to the base of tower, the attachment plate comprising attachment holes.

In some embodiments, the attachment holes are larger than the throughholes in the legs of the base.

In another aspect described herein, a method of supporting an object comprises placing a support device within a form, the support device comprising a shaft, the shaft comprising: a rod; a platform attached to a first end of the rod; a first thread disposed along at least a portion of the rod; a tower having an interior surface, the interior surface surrounding an opening in a first end of the tower, the opening configured to receive the rod, wherein the interior surface comprises a second thread formed on at least a portion of the interior surface and adapted to engage the first thread; inserting the shaft into the opening in the first end of the tower; and rotating the shaft to engage the first thread with the second thread.

In some embodiments, the method further comprises adjusting the support device to a desired height using a plurality of measurement indicators located on the shaft, the measurement indicators indicating the distance from a second end of the tower to a top surface of the platform.

in some embodiments, the method further comprises attaching an object to the platform.

in some embodiments, the method further comprise pouring concrete into the form around the support device, thereby embedding the object in the concrete at the predetermined height.

In some embodiments, the method further comprises retaining the tower in the concrete using a retention element, the retention element disposed on an exterior of the tower.

In some embodiments, the tower further comprises a base connected to a second end of the tower, the base comprising a plurality of legs extending radially from a central axis of the tower, the legs being formed having throughholes therein.

In some embodiments, the method further comprises attaching the base to an attachment plate, the attachment plate comprising attachment holes that are larger than the throughholes, the attachment plate configured to be attached to a substrate by inserting an attachment mechanism through the attachment holes and into the substrate.

In another aspect described herein, a support device comprises a shaft, the shaft comprising a rod having a first diameter; a platform attached to a first end of the rod, the platform having a pilot hole formed therein; at least one locking groove disposed along at least a portion of the rod, wherein the at least one locking groove has a second diameter, which is larger than the first diameter; and a tower comprising: a tower portion having a first end and a second end, the tower portion having an interior surface forming an opening in the first end, the opening configured to receive the shaft, wherein the interior surface comprises at least one locking member disposed on the interior surface, the at least one locking member configured to engage the at least one locking groove, respectively; a base connected to the second end of the tower portion, the base comprising a plurality of legs extending radially from a center of the tower portion; and a plurality of feet disposed on the plurality of legs.

In some embodiments, the at least one locking groove is configured to rotatably receive the at least one locking member, respectively, to releasably lock the shaft in position within the opening.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 9A depicts a partial cross section of a support having a notched rod portion inserted into a tower portion.

FIG. 10 depicts a perspective view of a support having a smooth shaft portion clamped into a tower portion.

DETAILED DESCRIPTION

In most construction projects, the design calls for certain structures, elements, or other objects to be embedded in concrete. These objects are generally placed within the concrete forms, and then concrete is poured into the forms, thus embedding the object in the poured concrete. One example of these "embeds" is a steel plate with steel anchors, which is cast into the slab in order to facilitate the future connection of a steel member, such as a column or support, to the concrete slab. The first step of the current method used to set these embeds involves attaching the steel plate to be embedded to a wood support (usually 2×4 s or plywood) built specifically for each embed. If the embed is located near the slab edge, the wood support with the embed attached is nailed to the edge form. If the embed is located away from the slab edge, L-angles (typically shelf brackets used to support shelves) are installed on the deck formwork (or supported in the ground in the case of a slab on grade) in order to secure the wood support with the embed attached thereto. The wood support is then screwed to the L-angles. The concrete is poured and cured. The L-angles are taller than the slab depth making it necessary to grind off excess material of the L-angle remaining above the slab after the pour. Current methods for embedding these objects into concrete are very time consuming, as each embed requires the contractor to set up equipment (such as saws, power cords, etc.), procure materials (such as plywood, 2×4 s, and the like), cut and assemble a custom support for each embed, and then remove any excess portions of the support after pouring the concrete. For example, when L-angles are used, the contractor is required to grind down the L-angle that is left exposed above the slab.

The present disclosure describes a system for supporting and holding in place an object (for example and not by way of limitation, anchor bolts, steel plates and the like) to be embedded in concrete. Embodiments of the present invention significantly reduce the amount of time and materials required to install embeds by only requiring the contractor to attach the embed to a device in accordance with embodiments of the present invention, set the device to the desired height, install, and pour the concrete. There is no set up or clean up required, nor are there wasted materials or labor after the embed has been cast.

Figure 1A:
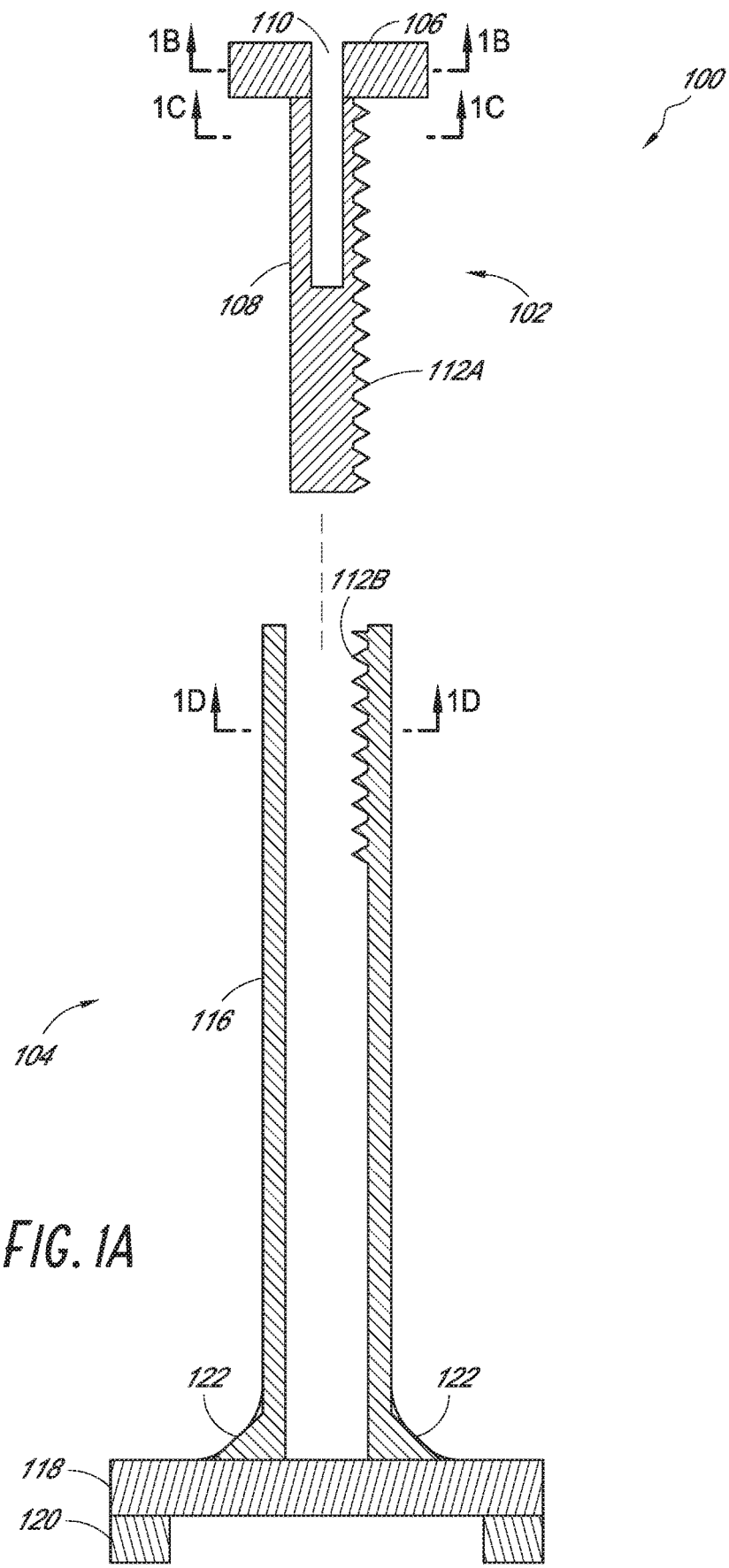
FIG. 1A depicts a cross section of a dissembled embodiment of a support.

Referring to FIG. 1A, device 100, in accordance with an embodiment of the present invention, comprises support shaft 102 and tower 104, where support shaft 102 is adapted to mate with tower 104, and when adjusted to the desired height tower 104 and shaft 102 are locked together (locking may be permanent or nonpermanent, the latter provided to readjust the height). The skilled artisan will appreciate that device 100 may be provided as a single unit, and the two separated pieces are exemplary.

Support shaft 102, in accordance with one embodiment, has platform 106 on which the object (not shown) to be embedded rests. Platform 106 is connected or integrally formed with rod 108, and rod 108 has locking teeth 112A that mate and lock with teeth 112B on tower 104 (described more fully below). Preferably teeth 112A are ridges embedded into the material of rod 108 (FIG. 1C), where the ridges are downwardly directed (not shown) in order to mate and lock with teeth 112B as described herein. In some embodiments, pilot hole 110 is formed in or through platform 106. In some embodiments, the pilot hole 110 extends through the shaft 108. The pilot hole 110 is used to aid in mounting the object (not shown) on platform 106, for example, by using a screw, rod, rivet, or other attachment device.

Figure 1B:
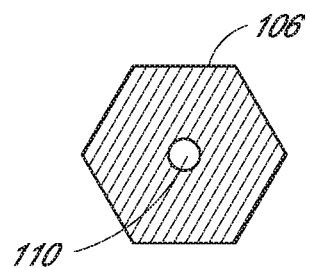
FIG. 1B depicts a cross section of the support shaft of FIG. 1A taken along line 1B-1B'.
Figure 1C:
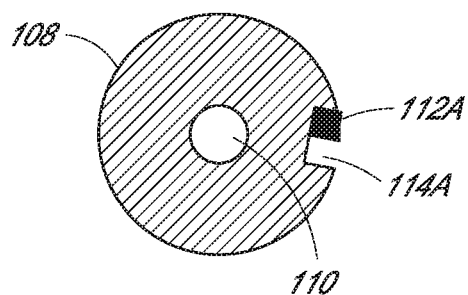
FIG. 1C depicts a cross section of rod of FIG. 1A taken along line 1C-1C'.

Referring to FIGS. 1B-1C, cross sections of support shaft 102 are provided. Platform 106 has a hexagonal shape, but the present disclosure is not limited thereto. Rod 108, in this embodiment, has a circular cross-section. However, the skilled artisan will recognize that other cross-sectional shapes will fall within the inventive concepts. For example and not by way of limitation oval, hexagonal and other shapes will work, but circular is preferred for ease of manufacture. Groove 114A extends vertically along rod 108 and in proximity to locking teeth 112A. Groove 114A slides over teeth 112B to permit rod 108 slide into and out of tower 104.

Referring again to FIG. 1A tower 104 has main body 116, base 118 and feet 120. Feet 120 are optionally present to minimize surface area contact of base 118 with the concrete forms (not shown). Holes (not shown) can also be provided in feet 120 or base 118 to secure device 100 to the forms. The skilled artisan will appreciate base 118 may have any appropriate or desired shape to achieve the purpose of supporting device 100 under the required loads to support the object. In some embodiments, base 118 has a tripod configuration where the three legs extend from body 116 at right angles (making them sit flat against a surface), although other angles may be chosen, and this preferred embodiment has three feet on the bottom of each leg. In an embodiment where the three legs extend from body 116 at angles greater than 90 degrees, it-feet 120 may not be present. Fillets 122 may optionally be included to enhance the structural strength of tower 104.

Figure 1D:
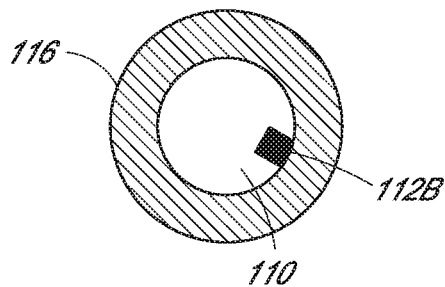
FIG. 1D depicts a cross section of the tower body of FIG. 1A taken along line 1D-1D'

Referring to FIG. 1D, the cross-section of tower body 116 has a shape matching that of rod 108 to receive rod 108 therein. In some embodiments, a groove may extend vertically along the inside of tower body 116 mirroring groove 114A, and would receive teeth 112A of shaft 108, if teeth 112A extended externally from the surface of shaft 108, rather than as shown in FIG. 1C.

In use, the object is rested or secured to platform 106. Rod 108 slides into and down main body 116 of tower 104, where teeth 112B slide along respective grooves 114A until platform 106 and the object are at the desired height, then rod 108 and body 116 are rotated relative to each other interlocking teeth 112A and 112B, thereby locking rod 108 and body 116 so they may not slide up and down relative to each other. In an alternative embodiment a ridge (not shown) may be provided at the base of the teeth 112A such that as teeth 112B are rotated over the ridges the device clicks into a locked or semi-locked position. If the holes (not shown) are provided in feet 120, they may be secured to the concrete forms (not shown), if not previously secured. The skilled artisan will appreciate that these steps may take place in any order as desired. Further the skilled artisan will recognize the teeth 112A and 112B may be replaced by any suitable mechanism to lock or fix rod 108 relative to body 116. For example and not by way of limitation, instead of teeth extending around only a portion of rod 108 and body 116, threads may extend all the way around and be pitched to mate with each other in a manner well known, obviously in this embodiment the grooves are not necessary. Rod 108 and body 116 would slide vertically relative to each other in this alternative embodiment by rotating either or both such that the threads moved one relative to the other until the desired height is attained.

In some embodiments, device 100 may be made from injection molded plastic with suitable structural characteristics in combination with the design of device 100 to structurally support the object. The skilled artisan will recognize many other materials from which device 100 may be manufactured, including without limitation cast aluminum. Preferably either or both rod 108 and body 116 are marked with measurements to allow the user to determine height without the need to use a measuring tape.

Figure 2:
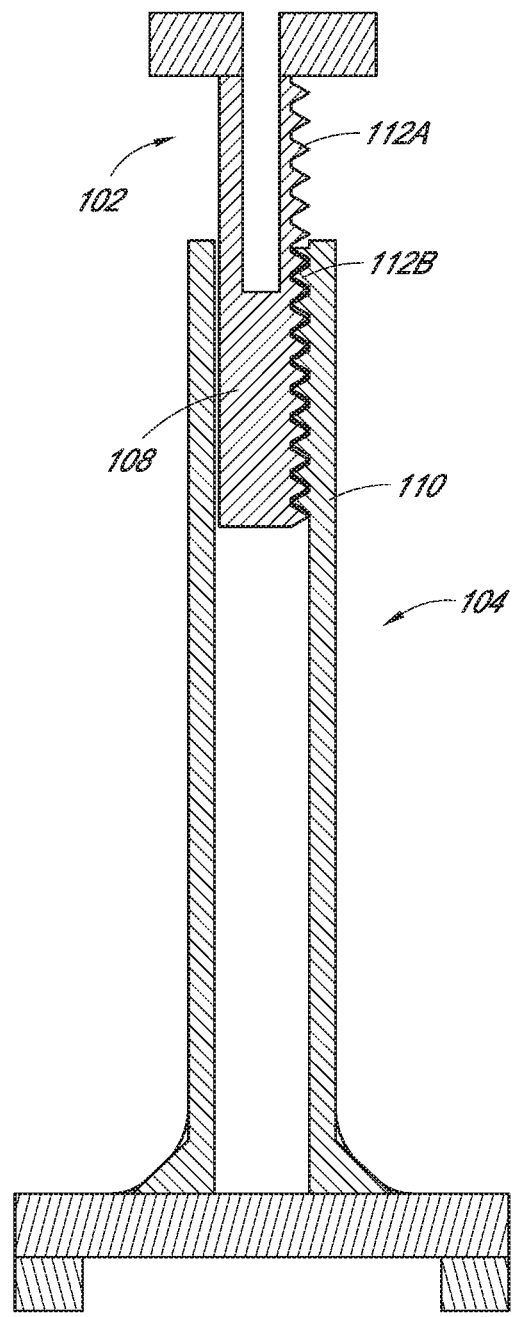
FIG. 2 depicts a cross section of an assembled embodiment of the rod and tower of FIG. 1

Referring to FIG. 2, the assembled support is shown, with the rod 108 disposed within the tower body 116.

Figure 3A:
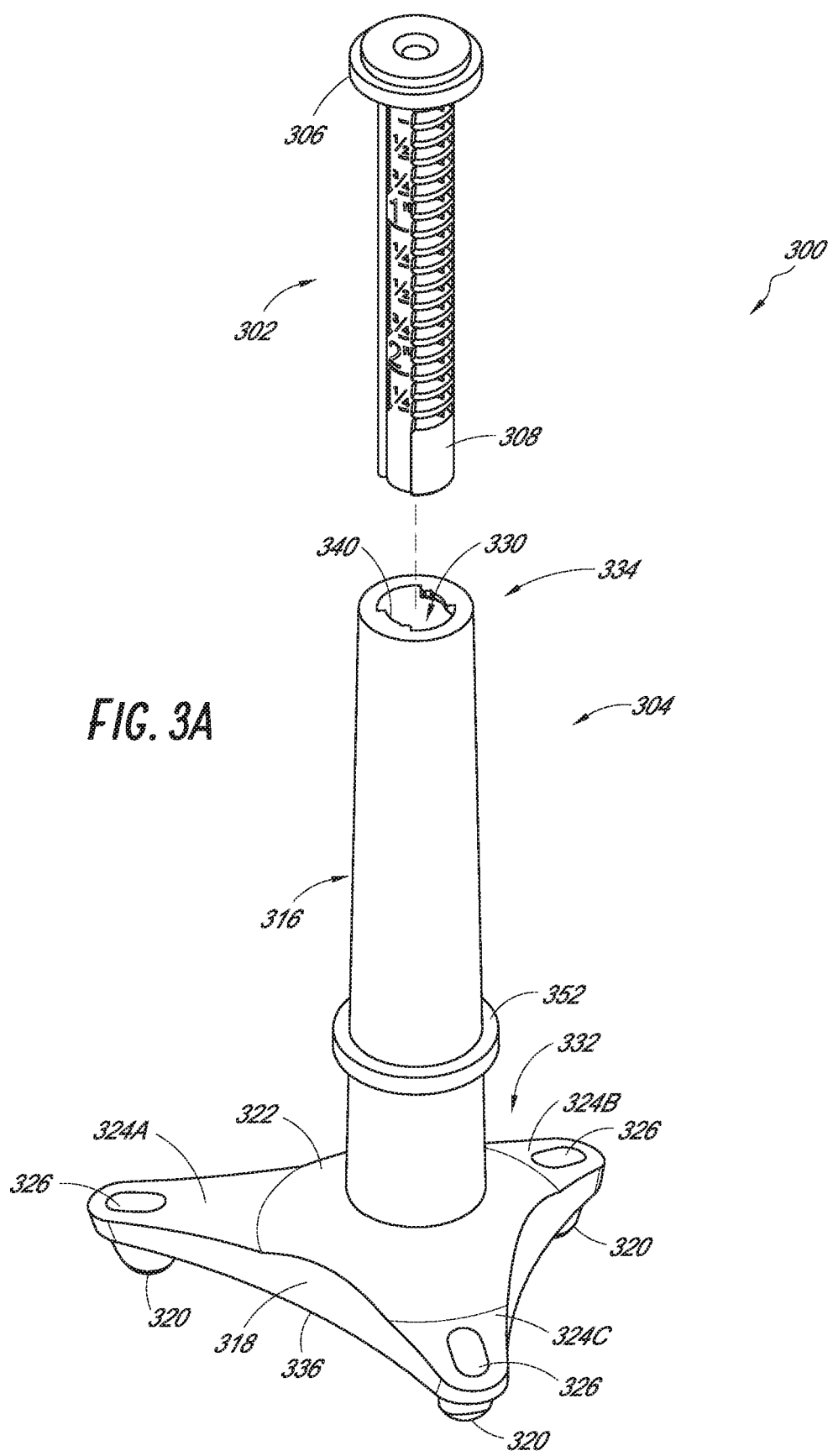
FIG. 3A is a perspective view of an embodiment of a support.

Referring to FIG. 3A, a support 300 comprises a tower 304 and a shaft 302. The shaft 302 is configured to be inserted into the tower 304, and to adjustably slide up and down within the tower 304, as will be described in greater detail below. The tower 304 comprises a tower body 316 and a base 318, which is attached to a first end 332 of the tower body 316. The tower body 316 and the base 318 can be integrally formed as a single piece, or can be separately formed and attached together by gluing, ultrasonic welding, and the like. The tower body 316 extends perpendicular to a plane of a bottom 336 of the base 318 such that the when the base 318 is placed on a surface, the tower body 316 extends perpendicular to the surface on which the base 318 is placed. in some embodiments, the tower body 316 can be connected to the base 318 at any desired angle, such that when the base 318 is attached or placed on a surface, the tower body 316 can extend at an angle of 30°, 45°, 60°, relative to the surface on which the base 318 is attached. In such embodiments, the platform of the shaft 302 can be similarly angled such that a surface of the platform extends perpendicular to the surface on which the base is attached.

The tower body 316 is forms an opening 330 disposed axially along a portion of the length of the tower body 316. The opening 330 is configured to receive an end of the shaft 302. In some embodiments, the opening 330 extends along the entire length of the tower body 316 and through the base 318. In some embodiments, the opening 330 extends along only a portion of the tower body 316.

In some embodiments, the tower body 316 can have a tapering inner diameter. As shown in FIG. 3A, the inner diameter of the first end 332 of the tower body 316 is larger than the inner diameter of a second end 334 of the tower body 316. The inner diameter of the tower body 316 gets smaller as the tower body 316 extends away from the base 318 and first end 332 of the tower body 316 toward the second end 334 of the tower body 316. The taper of the tower body 316 can provide extra strength for the tower 304 to support an embed, or an object to be embedded in the concrete.

In some embodiments, the tower body 316 may comprise a retention element 352. As shown in FIG. 3A, the retention element 352 may extend radially from an exterior of the tower body 316. In some embodiments, the retention element 352 circumferentially surrounds the tower body 316. In some embodiments, the retention element 352 comprises one or more protrusions extending from the exterior of the tower body. In some embodiments, the retention element 352 is integrally formed or molded as part of the tower body 316. In some embodiments, the retention element 352 is formed or molded individually and later fitted or attached to the tower body 316. The retention element 352 may be configured to retain the tower body 316 in the concrete after the surface is removed.

One or more locking members 340 can be formed within the opening 330 at the second end 334 of the tower body 316. In some embodiments, two locking members 340 are formed within the opening 330 on opposing sides of the opening 330. In some embodiments, the locking members 340 can be formed within the opening 330, on the inner surface of the tower body 316, at any position along the length of the tower body 316. The distance between the locking members 340 can correspond to the diameter of the shaft 302, which will be described in greater detail below.

The locking members 340 interact with corresponding features on the shaft 302 which will be described in greater detail below.

In some embodiments, two locking members 340 can be disposed on opposing surfaces on the inner surface of the tower body 316, in the same plane. In some embodiments, one or more additional locking members 340 a can be disposed farther down within the opening 330, on the inner surface of the tower body 316, formed in a plane parallel to the plane of the other locking members 340, spaced apart at a distance equivalent to the surfaces of corresponding locking channels formed on the rod portion 308, which will be described in greater detail below. In this way, the shaft 300 can support more weight, or support a heavier embed, as the two levels of locking tabs 340 can provide additional surfaces on which the weight of the embed can be distributed.

The base 318 comprises one or more legs 324. As depicted, the base 318 includes 3 legs 324, disposed equidistant from each other around the base 318, and extending radially from the center of the base 318 and the center of the tower body 316. Each of legs 324 can include a foot 320 attached thereto. The feet 320 can taper such that the diameter of the foot 320 is larger near the base 318, and narrows as the foot 320 extends away from the base 318. In this way, the foot 320 minimizes the footprint of the support as it is cast into the concrete, such that the support is nearly invisible when viewed from below, where, for example, the concrete slab is an overhead slab, or is accessible from below.

The legs 318 may include throughholes 326. Throughholes 326 can extend through the feet 320, such that an anchoring device can be driven through the legs 324 and the feet 320, to anchor the base 318 to a surface. For example, the base 318 can be placed on a surface within a concrete form to support an embed within a concrete slab to be poured. In order to ensure accurate placement of the embed, the support 300 should stay firmly in place when attaching the embed to the support 300 (which will be described in detail below), and when pouring the concrete. To ensure the base 318, and thus the support 300, stays in the desired position, an anchor can be inserted into each of the throughholes 326, through the feet 320, and into the surface on which the base 318 is placed. in some embodiments, the anchor can be a nail, screw, rivet, bar, rod, bolt, or any other desired attachment anchor. The head of the anchoring device, such as the head of the nail, can be larger in diameter than the diameter of the throughhole 326 (or the largest dimension of the throughhole 326 if the throughhole 326 is not circular), so that the shaft of the nail goes through the throughhole 326 and into the surface on which the base rests, while the head of the nail impinges the base 318. This will hold the base 318 firmly in place during use.

In some embodiments, one or more of the throughholes 326 can extend through the base 318 and the foot 320 at an angle other than perpendicular to the plane of the bottom 336 of the base 318. For example, the throughhole 326 located in the leg 324a which is longer than legs 324b and 324c can have an inner surface which is not perpendicular to the surface on which the base 318 can be placed, or which is not parallel to the direction in which the tower body 316 extends. Having an angled throughhole 326 in one or more of the legs 324a-c may allow for greater flexibility to use the support 300 in areas or places that are more difficult to access. For example, where a nail is used for attaching the base 318 to a surface, and an object to be embedded is attached to the shaft 302, the distance between the surface, and an underside of the object to be embedded is a fixed distance, which may not be sufficient to allow a user to swing a hammer sufficiently to drive the nail into the surface. By having an angled throughhole 326, the distance for swinging a hammer can be increased. If the angle of the throughhole 326 is great enough, the object to be embedded may not be in the swinging path of the hammer.

Figure 3B:
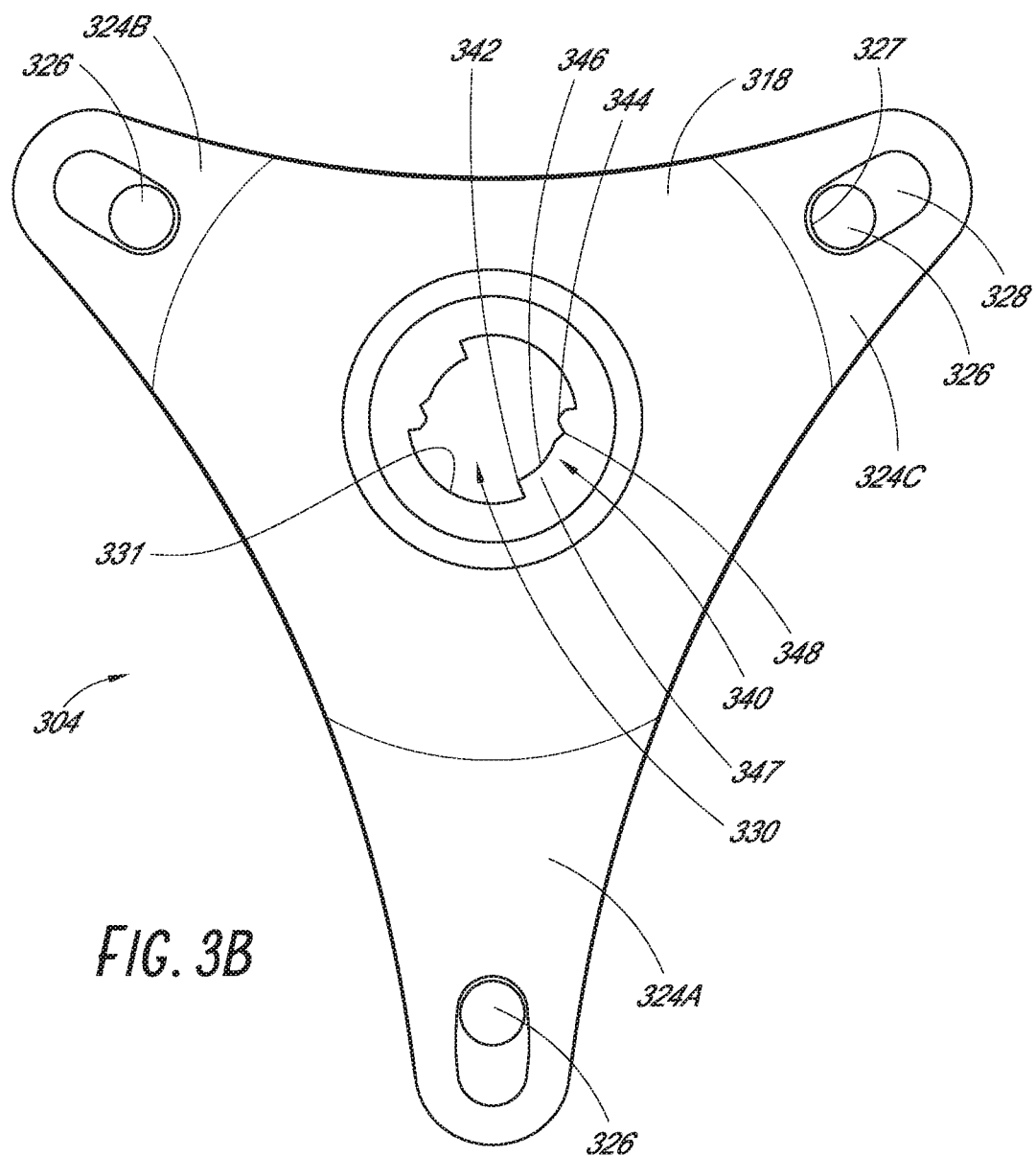
FIG. 3B is a top view of the tower portion of FIG. 3A.

In some embodiments, the throughhole 326 can have a varying diameter along the length of the throughhole 326. For example, as seen in FIG. 3B, the throughhole 326 can have an inner portion 327 which extends perpendicular to the plane of the bottom 336 of the base 318, and an outer portion 328, which extends at an angle other than perpendicular to the plane of the bottom 336 of the base 318. Thus, a nail, or other anchor device, can be driven in at an angle other than perpendicular to the surface on which the base 318 is placed.

In some embodiments, the legs 324 may be of different lengths. For example, as depicted, a first leg 324a is longer than the other legs 324b and 324c. The different lengths of the legs 324 can ensure that a user has options for securing the post. For example, the geometry or dimensions of an object to be supported extend in such a way as to interfere with the throughholes 326, or which do not allow sufficient room for a nail or other anchor device to be driven through the throughhole 326. By extending the first leg 324a a distance farther from the central axis of the tower 304, the throughhole 326 is moved farther from the central axis of the tower 304, and farther from a potentially interfering object to be supported. Thus, by extending one leg, a user may have sufficient room to swing a hammer in order to drive a nail through the throughhole 326 in the first leg 324a, whereas there may not be sufficient room to drive a nail through the throughholes 326 in the other legs 324b and 324c. The length of the first leg 324a can also provide greater flexibility in nailing, since it offers a different nailing point than the other legs 324b and 324c. For example, the longer first leg 324a may be over a different type of subgrade or nailing surface than the other legs 324b and 324c.

In some embodiments, the base 318 includes a supporting fillet 322, which surrounds the tower body 316, and which provides structural support for the tower body 316. In some embodiments, the supporting fillet 322 may be omitted, or may be of another design. A person of skill in the art, guided by this disclosure, would understand that structural support for the tower body 316 can be provided in various ways in addition to the supporting fillet 322.

FIG. 3B depicts a top view of the tower 304. The locking mechanisms 340 can be seen on opposing sides of the opening 330. The locking mechanisms 340 each comprise a first end 342, a second end 344, an inner surface 346, a top surface 347, and a notch 348, which is formed as an indent or depression in the inner surface 346. The notch 348 is formed in the inner surface 346 in a direction extending from the center of the opening 330 radially outward toward the tower body 316. The inner surface 346 is curved, and follows the contour of an inner surface 331 of the opening 330. The inner surface 346 curve also corresponds to the outer surface of the shaft 302, which will be described below.

Figure 4A:
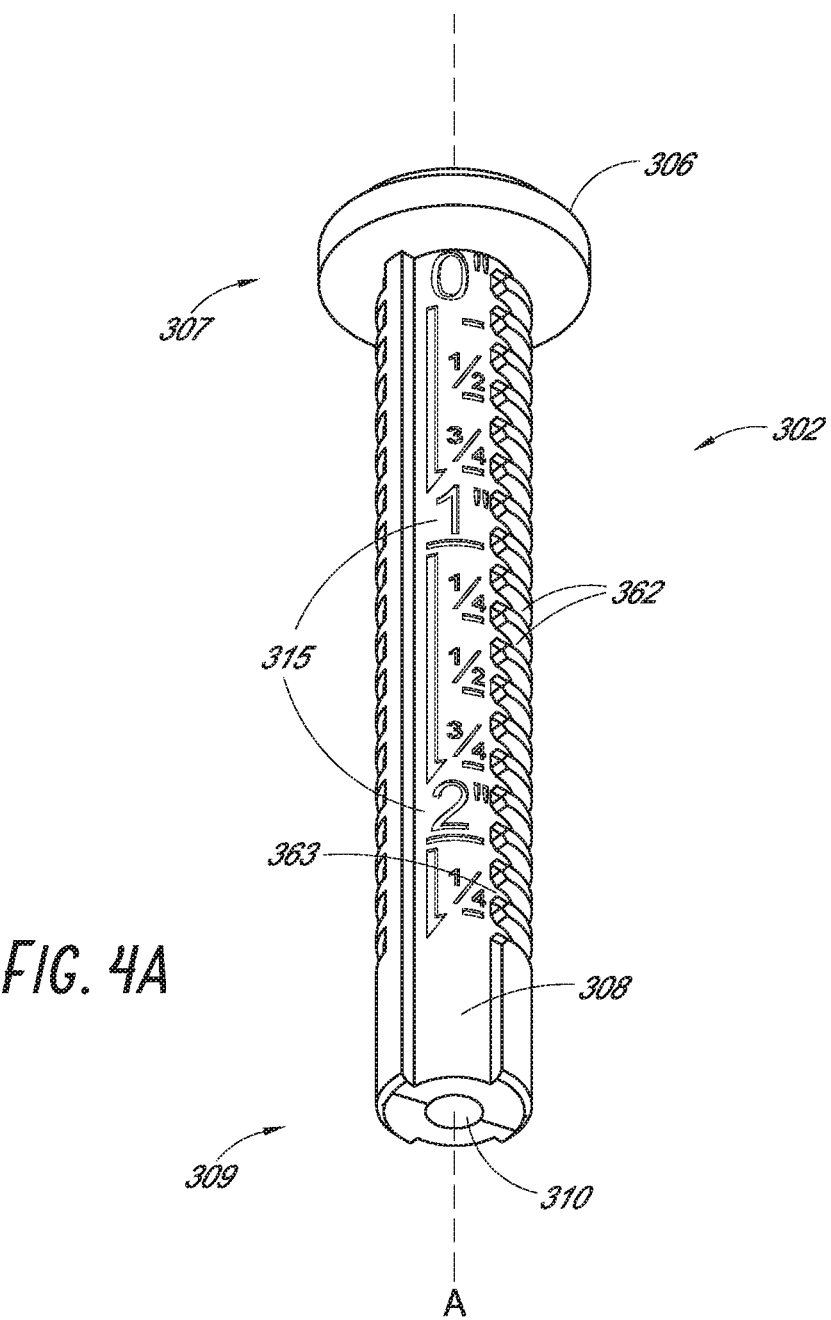
FIG. 4A is a perspective view of an embodiment of a shaft portion of a support.

FIG. 4A depicts an embodiment of the shaft 302, sized and shaped to fit into the opening 330 of the tower 304. The shaft 302 comprises a platform 306 and a rod portion 308. The platform 306 is located at a first end 307 of the shaft 302, and comprises a planar surface disposed perpendicular to an axis A of the rod portion 308. The platform 306 can be circular, rectangular, square, or any other shape, as desired.

The platform 306 is formed with a pilot hole 310 therein. The pilot hole 310 can be a hole, an indentation, a through-hole, and the like. The pilot hole 310 is formed in the center of the platform 306 and can be axially aligned with the axis A of the rod portion 308 of the shaft 302. In some embodiments, the pilot hole 310 can extend the length of the shaft 302, from the first end 307 in the platform 306, through to a second end 309.

The pilot hole 310 is configured to receive an attachment device (not shown), such as a screw, a nail, a bolt, and the like. In some embodiments, the pilot hole 310 may have an internal thread formed therein to mate with threads on a screw or bolt inserted into the pilot hole 310. In this way, an attachment device can be releasably retained within the pilot hole 310, and an embed can be securely attached to the shaft 302, as will be described elsewhere herein. In some embodiments, the pilot hole 310 may not have a threaded pilot hole 310.

Figure 4B:
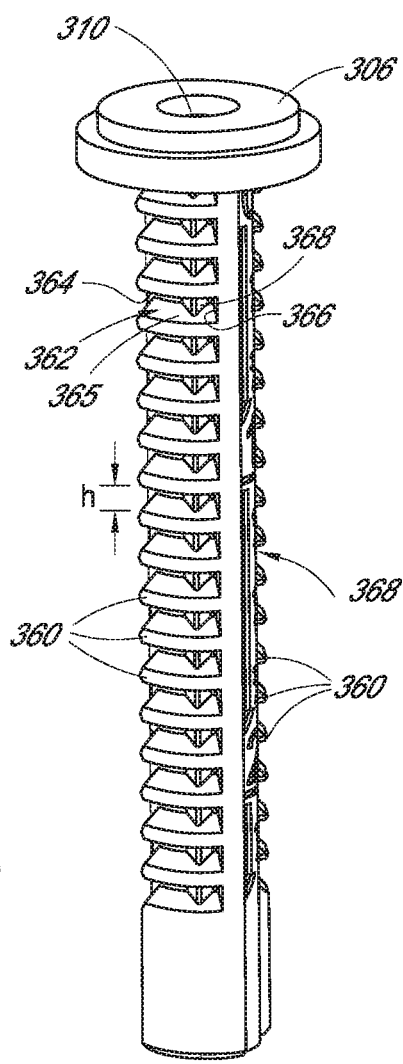
FIG. 4B is a front view of the shaft portion of FIG. 4A

As shown in FIGS. 4A and 4B, the rod portion 308 comprises two sets of locking threads 360 formed on opposite sides of the rod portion 308. The locking threads 360 are formed radially around the outer surface of the rod portion 308. In some embodiments, each of the sets of locking threads 360 together extend around about one-half of the circumference of the rod portion 308. In some embodiments, the locking grooves extend around less or more than one-half of the circumference of the rod portion 308. The locking threads 360 can be formed in parallel planes along a length of the rod portion 308. The sets of locking threads 360 comprise a plurality of locking channels 362. The plurality of locking channels 362 each comprise a channel opening 363, an upper surface 364, a lower surface 365, a stop 366, and a locking ridge 368. The locking channel 362 has a height h, which is sized to accept one of the locking members 340 formed in the opening 330 on the tower 304. The upper surface 364 is a planar surface extending radially around the rod portion 308, parallel to the platform 306, and perpendicular to the axis A of the rod portion 308. The upper surfaces 364 of each of the locking threads 360 can be formed in parallel planes.

The lower surface 365 can be a planar surface, or can be a tapered surface of increasing diameter, increasing along a direction from the first end 307 to the second end 309 of the shaft 302. The stop 366 is a planar surface formed perpendicular to the top surface 364 and the lower surface 365, and protrudes from the rod portion 308 radially outward, perpendicular to the axis A. The stop 366 is formed at an end of the locking channel 362 opposite the opening 363.

The locking ridge 368 is a ridge, bump, protrusion, tab, or other similar feature that extends radially outward from the rod portion 308, and extends from the lower surface 365 to the upper surface 364. The locking ridge 368 is disposed proximate the stop 366, away from the channel opening 363. The locking ridge 368 is sized and shaped to mate with the notch 348 formed in the locking tab 340, as will be described in greater detail below.

The rod portion 308 also comprises measurement indicators 315. The measurement indicators 315 comprise markings, numerals and units, such as inches, centimeters, and the like. The markings are aligned with upper surfaces 364 and correspond to specific measurements, whose use will be described in greater detail below. The measurements indicators 315 can be in increments of 1 mm, 10 mm, 1 cm, 2 cm, 1/16", 1/8", 1/4", 1/2", or any other unit of length. When the shaft 302 is inserted into the opening 330 of the tower 304 and locked in place (as will be described below), one of the markings of the measurement indicators 315 will align with the second end 334 of the tower body 316. The measurement indicator 315, that is, the marking and the corresponding numeral and unit (e.g., 1¼ inch) aligned with the top of the tower 304, correspond to the height of the platform 306 from the surface on which the tower 304 is located. For example, when the shaft 302 is installed in the tower 304, the measurement indicator 315 aligned with the second end 334 of the tower body 316 corresponds to the distance from the bottom of the feet 320 and the planar surface of the platform 306. In some embodiments, the measurement indicators will indicate the entire distance, such as 7 inches, 8½ inches, or any other desired measurement. In some embodiments, the measurement indicators 315 will correspond to the distance between the top of the tower 304, or the second end 336 of the tower portion 316, and the surface of the platform 306. In this case, the tower portion 316 can have a height indicator thereon. For example, the tower platform may have a 5 inch, 6 inch, 7 inch, etc. marking thereon to indicate how tall the tower 304 is, or the distance between the feet 320 and the second end 334 of the tower body 316. Then, to determine the distance between the surface on which the tower 304 is placed and the platform 306, a user can add the distance measurement on the tower body 316, e.g., 7 inches, to the measurement indicator 315 on the shaft 302, e.g., 1½ inches, to get an overall height of 8½ inches. Thus, a user can determine how far the platform is off the surface on which the tower 304 is placed. In some embodiments, the shaft 302 may not have a measurement indicator 315 thereon. The user may use a measuring device, such as a ruler or tape measure, to measure and/or set the height of the platform 306 above the surface on which the tower 304 is placed.

Figure 5:
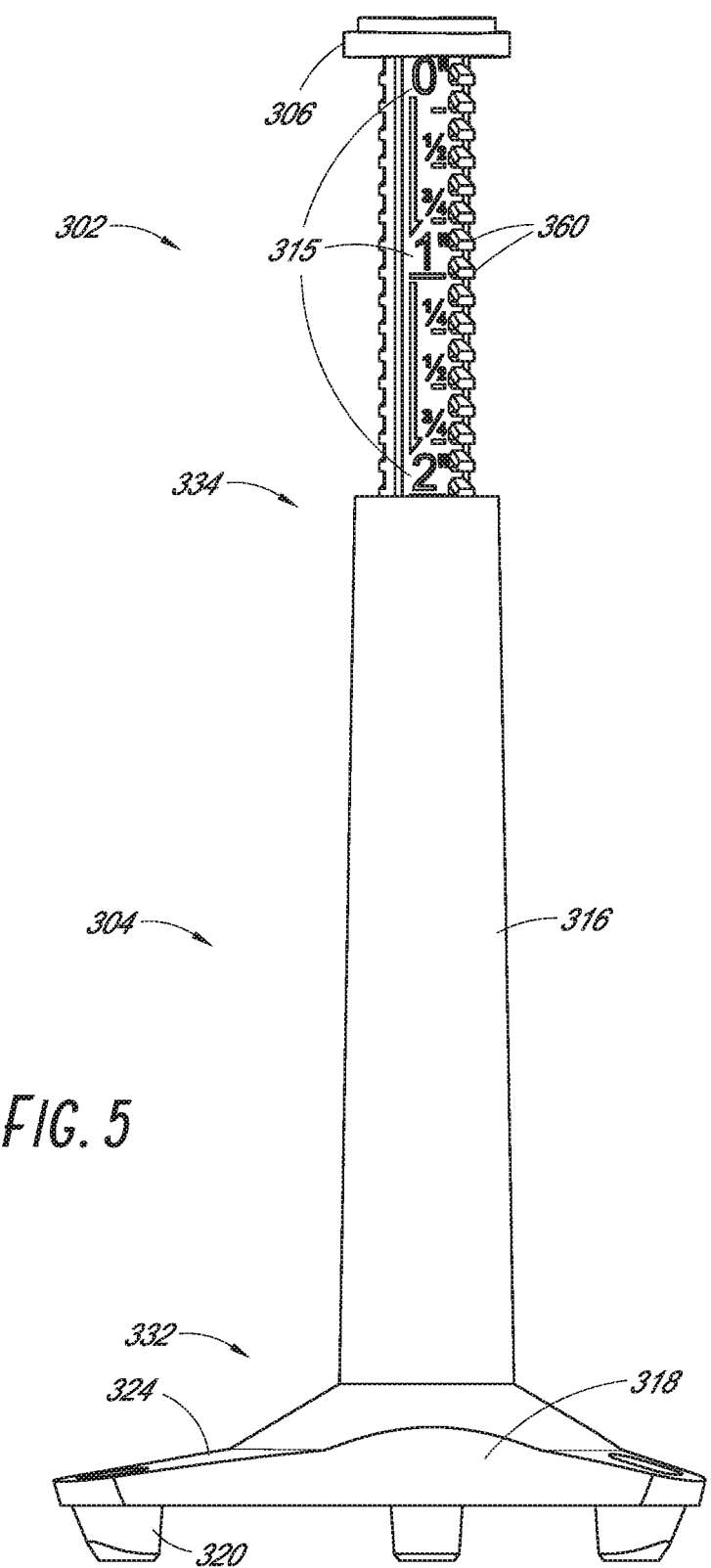
FIG. 5 is a perspective view of a support having a shaft portion inserted into the tower portion.

FIG. 5 depicts the support 300 in an assembled state, with the rod portion 308 inserted into the tower body 316 to the desired height and releasably retained within the tower body 316 by the interaction between the locking tab 342 and the locking threads 360.

Operation of the support 300 will now be described. As an example, the support 300 can be used in an application that requires suspending an electrical box (not shown), such as for a floor outlet, in a concrete slab. In this example, the slab is to be 11½ inches thick, the electrical box is to 3 inches thick, and a support 300 having a 7 inch tower is used. A concrete form is prepared, or has previously been prepared. In this example, the concrete slab is assumed to be on grade, or on a prepared substrate. The tower 304 is placed in the form on the grade or prepared substrate. The tower 304 is positioned within the form at the desired location of the electrical box. The tower 304 is attached to the grade or the substrate using nails or screws, or other desired fasteners.

Once the tower 304 is positioned, the shaft 302 is inserted into the opening 330 in the tower body 316. To insert the shaft 302, the shaft 302 must be inserted such that the locking threads 360 are not aligned with the locking tabs 340. That is, the shaft 302 is inserted so that the portion of the rod portion 308 which is does not include the locking threads 360 is axially or vertically aligned with the locking tabs 340. The diameter or cross-sectional area of the rod portion 308 is smaller than the diameter of the opening 330, so the rod portion 308 will be easily received into the opening. The rod portion 308 is inserted until the measurement indicator 315 corresponding to 1½ inches is aligned with the second end 334 of the tower body 316. By setting the rod portion 308 at the 1½ inch measurement indicator 315, the platform 306 is positioned 1½ inches above the top of the tower body 304, which is 7 inches tall, for a total height from the grade or substrate of 8½ inches.

When the shaft 302 is at the desired position, the shaft 302 is rotated about axis A. As the shaft 302 rotates, the first end 342 of the locking tab 340 is received into the channel opening 363. The first end 342 of the locking tab 340 may impinge the tapering lower surface 365, and, as the shaft 302 is further rotates, the first end 342 can travel along the lower surface 365. The top surface 347 may impinge the upper surface 364 of the locking channel 362 into which the locking tab 340 has been received. The inner surface 346 of the locking tab 340 also slides along an outer surface of the rod portion 308 as the shaft 302 is rotated.

As the shaft 302 is rotated further, the first end 342 impinges on the ridge 368 and slides over the ridge 368. As the shaft 302 is rotated even further, the ridge 368 will align with the notch 348, and the ridge 368 will be received into the notch 348. The notch 348 is spaced from the first end 342 of the locking tab 340 such that when the notch 348 receives the ridge 368, the first end 342 will impinge on the stop 366. The stop 366 will prevent further rotation of the shaft 302. The fit between the notch 348 and the ridge 368 will provide a locking function, preventing the shaft 302 from being accidentally or inadvertently rotated. However, the shaft 302 can still be rotated to release the locking tab 340 from the locking channel 362 by the application of sufficient force. This process has been described for one locking tab 340 interacting with one locking thread 360, however, a person of skill in the art will understand that where two sets of locking threads 360 and two locking tabs are provided, the same procedure described above will occur at the same time for both locking tabs 340 and for two locking threads 360.

In some embodiments, the rod portion may comprise 1 or more sets of locking threads 360. In some embodiments, the rod portion may comprise 2, 3, 4, 5, 10, 20, or more sets of locking threads 360, as desired to establish or set a desired height increment by which the shaft 302 can be adjusted. If a smaller increment is desired, more locking threads 360, space closer together, can be used. In some embodiments, the tower body 316 may comprise 1, 2, 3, 4 or more locking tabs 340. In this case, the process described above would occur at the same time for the number of locking tabs 340 interacting with a corresponding number of locking threads 360.

In some embodiments, the shaft 302 can be rotated into the desired position, and the platform set to the desired height prior to attaching the tower 304 to the grade or prepared substrate.

After the shaft 302 has been locked into the desired position (as shown in FIG. 5), the 3 inch thick electrical box can be connected to the platform 306 using the pilot hole 310. The electrical box may have a mounting hole or a screw hole formed therein. The mounting hole (not shown) in the electrical box (not shown) is positioned over the pilot hole 310 in the shaft 302, and a screw, nail, or other attachment mechanism is inserted into the mounting hole and the pilot hole 310 to attach the electrical box to the platform 306. By setting the total height of the support from the grade or substrate to 8½ inches, the 3 inch electrical box will be flush with the 11½ inch concrete slab.

When the support 300 has be positioned within the frame, set to the desired height, as indicated on the measurement indicators 315, and the electrical box is attached via the pilot hole 310, the concrete can be poured into the frame. The concrete will flow around the support 300 and the portion of the electrical box to be embedded in the concrete. The support 300 will hold the electrical box in position as the concrete is poured. After the concrete is finished, such as troweled, floated, etc. to the desired thickness and the concrete has cured, the screw or attachment mechanism can be removed from the mounting hole of the electrical box and the pilot hole 310 of the support 300, resulting in the electrical box being positioned within the slab at the desired position.

The order in which the components of the support 300 are used can vary without departing from the scope of the present disclosure. For example, a user may set the shaft 302 to the desired height, attach the object to the platform 306 using the pilot hole 310, then attach the tower 304 to the grade or prepared substrate.

Figure 6:
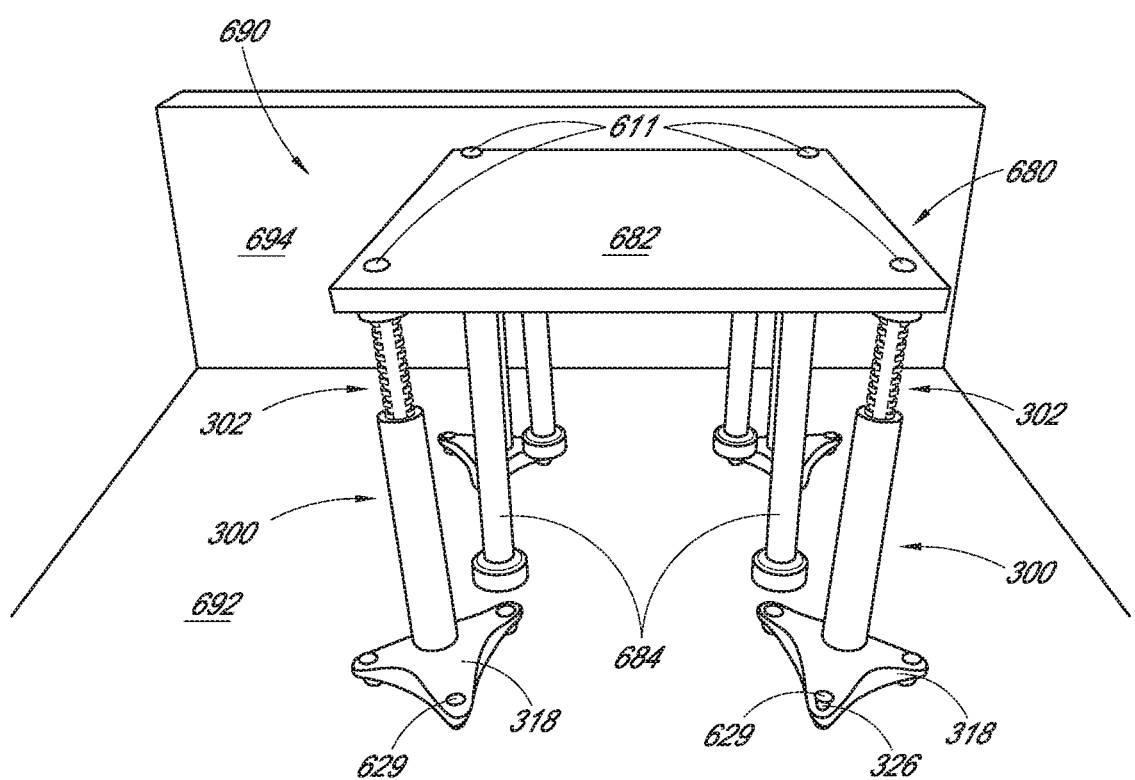
FIG. 6 is a photograph of a support within a concrete form supporting an embed.

FIG. 6 depicts a perspective view of multiple supports 300 being used in an application to support an embed 680 in a form 690, prior to concrete being poured. The embed 680 is a steel plate and includes a top surface 682, in which holes (not shown) are formed, and posts 684 which extend downward from the top surface 682. The supports 300 are attached to a bottom surface 692 of the form 690. The supports are securely held in place by nails 629 which are inserted into throughholes 326 of the base 318, and secured into the bottom surface.

The embed 680 is attached to the supports 300 via screws 611. The screws 611 pass through holes (not shown) in the top surface 692 of the embed 680, and into the pilot holes 310 formed in supports 300. The shafts 302 of the supports 300 have been set at the proper height and locked into place within the tower portions 316 as described elsewhere herein. The shafts have been set at the proper height such that the top surface 692 of the embed 680 is aligned with a top plane of a vertical portion 694 of the form 690, so that the top surface 692 will be flush with the finished surface of the concrete.

After the supports are secured to the form 690 and the embed 680 is secured to the supports, which are set at the desired height, the concrete (not shown) can be poured into the form. As the concrete is poured, the supports 300 will stay secured in place, and the concrete will flow around the supports 300 and the posts 684. The posts 684 will become securely fixed within the concrete. After the concrete has set, the embed 680 will be at the desired elevation within the concrete. The screws 611 can be removed from the holes in the top surface 682 and the pilot holes 310 in the supports 300. In this way, there is no need to build a rig or use other constructions to hold the embed 680 in place for concrete pouring. After the screws 611 are removed, there is no part of the support 300 protruding above the surface of the concrete. Nothing needs to be cut off, ground down, or removed, resulting in an efficient and effective way to position embed 680 within concrete.

Although embed 680, a steel plate, is shown herein, other embeds, such as electrical boxes, conduits, forms, and other objects can be embedded in concrete using the supports 300 described herein, without departing from the scope of the specification.

Figure 7A:
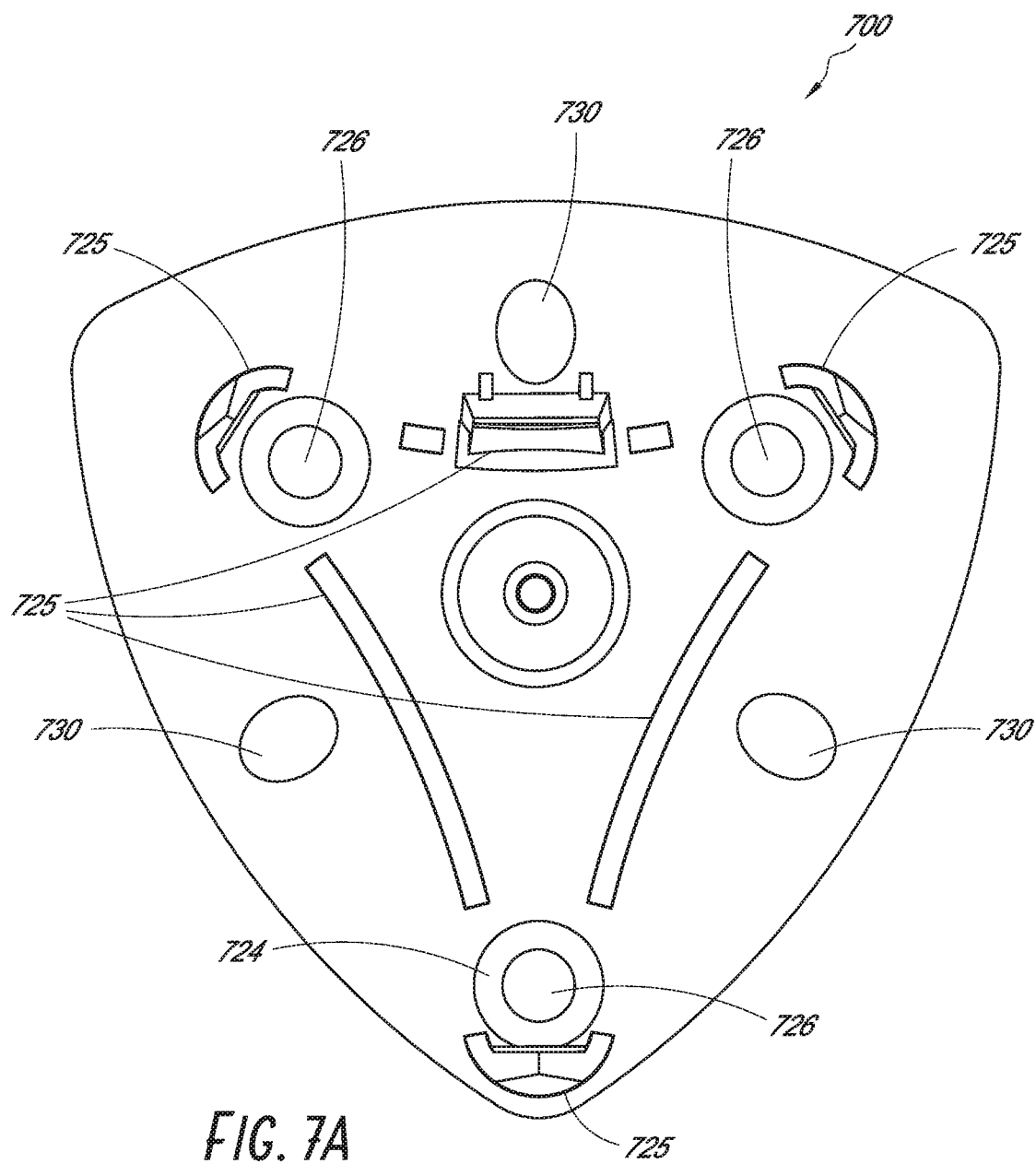
FIG. 7A is a perspective view of an embodiment of an attachment plate configured to attach to a support.
Figure 7B:
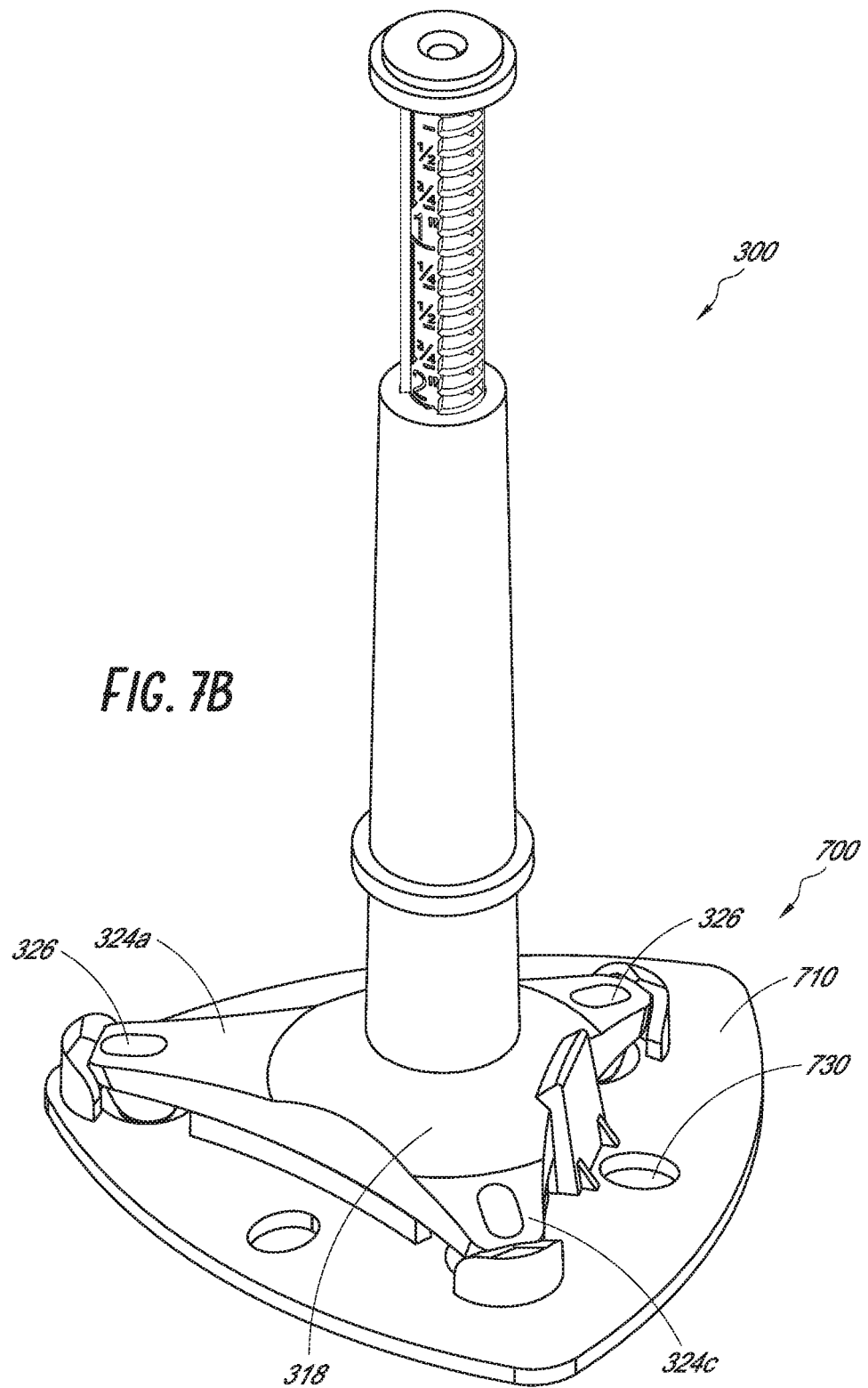
FIG. 7B depicts a perspective view of the attachment plate of FIG. 7A attached to a support.

FIG. 7A depicts an attachment plate 700 configured for use with the support 300 described herein. FIG. 7B depicts the support 300 attached to the attachment plate 700. The attachment plate 700 comprises a planar surface 710, guide surfaces 724, locking members 725, receiving holes 726, and attachment holes 730. The guide surfaces 724 are formed on the planar surface 710 and extend perpendicular upward from the planar surface 710. The guide surfaces have the same contour as, correspond to, or are configured to receive or mate with surfaces on the underside of the base 318. The locking members 725 are positioned on the planar surface at positions that correspond with the ends of the legs 324a-324c of the support 300. The locking members 725 are positioned to provide a snap fit or friction fit of the ends of the legs 324a-c when the support is placed onto the attachment plate 700. The receiving holes 726 correspond to the throughholes 326 and the feet 320 of the support 320. The receiving holes are formed in the planar surface 710, and, as shown, have a tapering inner diameter 724 as the receiving hole 726 extends through the planar surface. The tapering inner diameter is configured to correspond to a dimension of the feet 320 of the support 300. In this way, the receiving hole 726 receives the feet 320 of the support 300 such that the underside of the base 318 can contact or mate with the guide surfaces 742. The attachment holes 730 are formed as throughholes in the attachment plate 700. The attachment holes 730 can be distributed evenly around the attachment plate 700, and can be offset from the receiving holes 726. In some embodiments, there can be 1, 2, 3, or more attachment holes. The attachment holes 730 can have a larger diameter than the throughholes 326 in the support 300. In this way, the attachment holes 730 can receive a larger anchoring device, such as a larger nail, bolt, etc.

The attachment plate 700 can be used in an application where a concrete form is formed on a loose surface, such as gravel, dirt, and the like. Mounting the support 300 on such a loose surface may be difficult using only anchors inserted through the throughholes 326 in the base 318, as the smaller diameter anchors, such as nails, may not provide adequate support in a loose surface. The larger attachment holes 730 can allow for a larger diameter anchor, such as a nail or the like, to be inserted through the attachment holes 730 and into the loose surface to ensure the attachment plate 700 and the support 300 stay in place during concrete pouring. To use the attachment plate 700, the base 318 is inserted into the corresponding portions of the attachment plate 700. That is, the feet 320 are inserted into the receiving holes 726, and the ends of the legs 324a-c form a snap or friction fit with the locking members 725. The guide surfaces contact the underside of the base 318. In this way, the support 300 is securely, releasably attached to the attachment surface 700. The attachment surface 700 can be then anchored to the loose surface using appropriate anchors, which will keep the support 300 in place as concrete is poured into the frame. The object connected to the platform 306 will then be positioned within the concrete as desired. Of course, the steps of attaching the object to the platform 306, attaching the support to the attachment plate 700, and anchoring the attachment plate to the loose surface can be performed in any order, as desired.

The attachment plate shown and described is exemplary. A person of skill in the art, guided by this disclosure, would understand that the attachment plate 700 can vary based on the dimensions, shape, size, etc. of the support 300 to which the attachment plate 700 is configured to attach.

Figure 8A:
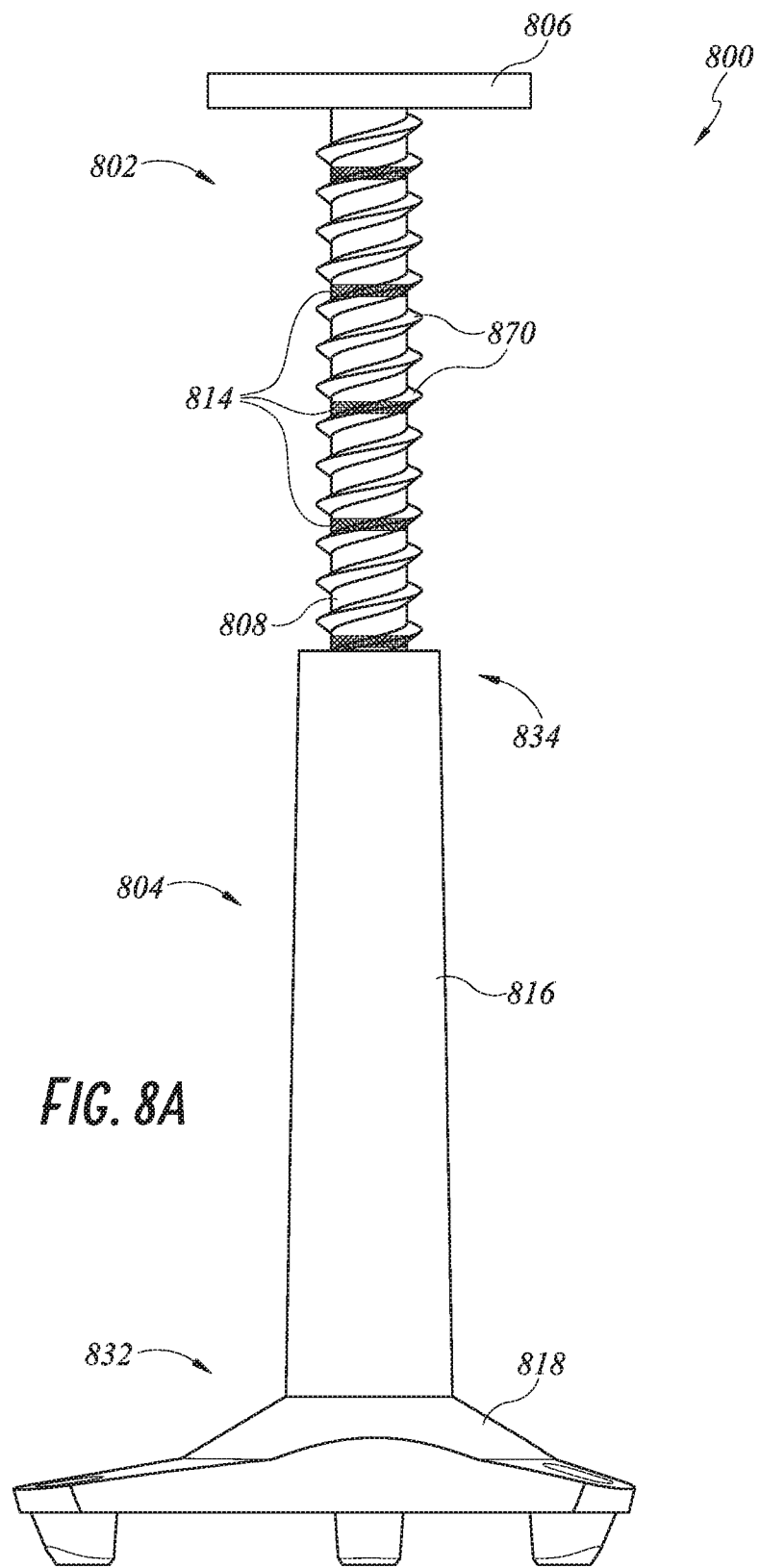
FIG. 8A depicts a perspective view of an embodiment of a support having a shaft portion threaded into a tower portion.

Referring to FIG. 8A, a support 800 comprises a shaft 802 and a tower 804. The shaft 802 comprises a platform 806 and a rod portion 808. The rod portion 808 comprises threads 870 that surround an outer surface of the rod portion 808. The tower 804 comprises a tower body 816 and a base 818, which is attached to a first end 832 of the tower body 816. The tower body 816 and base 818 can be substantially similar to those described above with reference to FIG. 3A. The shaft 802 is configured to be threaded into a second end 834 of the tower body 816 and be adjustably retained within the tower body 816 by an interaction between the threads 870 on the rod portion 808 and corresponding threads (not shown) on the inner surface of the tower body 816. In one embodiment, the rod portion 808 is color coded with colored markers 814 corresponding to predetermined measurements. For example, in some embodiments, for every ¼ inch there is a thin strip of yellow around the circumference of the rod portion 808. In some embodiments, a color may be assigned for each measurement value. For instance, red signifies a 1 inch marker, blue signifies a ¾ inch marker, green signifies a ½ inch marker, and yellow signifies a ¼ inch marker. In one embodiment, a key or guide (not shown) for the color coding scheme may be printed onto the exterior of the tower body 816 for reference by an operator. The skilled artisan will appreciate that alternative color coding schemes could be implemented. In this manner, the height of the platform 806 is determined by aligning a colored marker 814 with the second end 834 of the tower body 816.

Figure 8B:
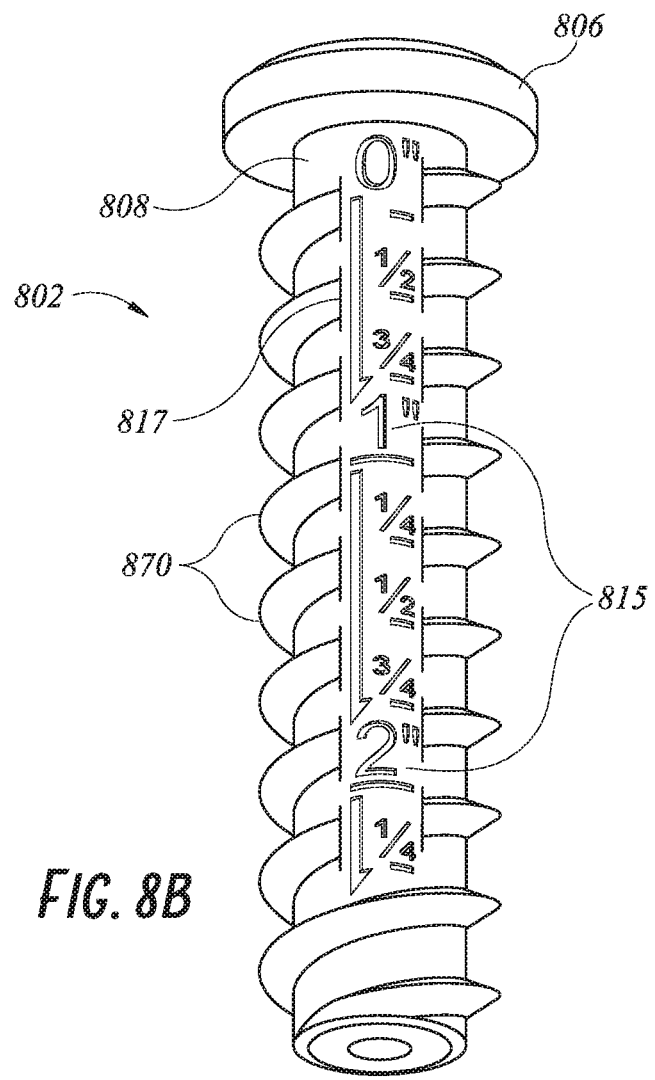
FIG. 8B depicts a perspective view of a threaded shaft with measurement indicators.

Referring to FIG. 8B, the shaft 802 comprises the platform 806 and the rod portion 808. In one embodiment, the rod portion 808 comprises measurement indicators 815 and threads 870 which are formed with breaks or gaps 817 therein. The threads 870 are discontinuous around a circumference of the rod portion 808 to allow for the measurement indicators 815. The breaks 817 can comprise a smooth surface of the rod portion 808 and can be vertically aligned for each thread 870. The measurement indicators 815 may be substantially similar to those described above with reference to FIG. 4A.

Figure 8C:
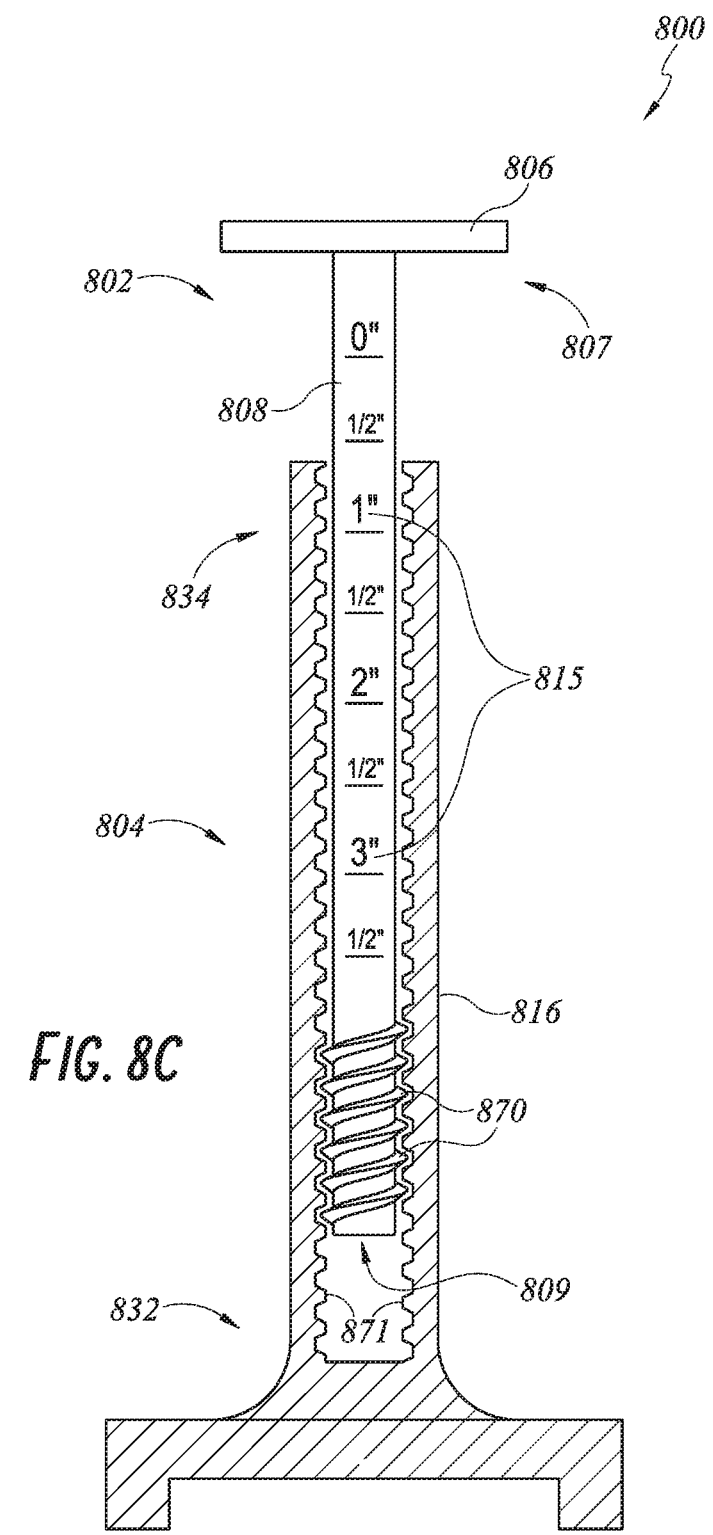
FIG. 8C depicts a cross section of an embodiment of a support having a partially threaded rod threaded into a tower.

FIG. 8C depicts an alternative embodiment of the support 800, wherein the shaft 802 comprises a first end 807 and a second end 809. The second end 809 comprises threads 870, while the remainder of the rod portion 808 that does not comprises threads 870 comprises measurement indicators 815. The inner portion of the tower body 816 comprises corresponding grooves, teeth, or threads 871 that run along a substantial portion of the inner surface of the tower body 816 and allow the rod portion 808 to be threaded in and out of the tower body 816. The measurement indicators 815 on the rod portion 808 are similar to those described above with reference to FIG. 4A. Advantageously, the measurement indicators 815 are easily visible due to the fact that the threads 870 do not extend along the entirety of the rod portion 808 but are instead limited to the second end 809 of the rod portion 808.

Operation of the support 800 will now be described with reference to FIGS. 8A-8C. As an example, the support 800 can be used in an application that requires suspending a 3 inch electrical box (not shown) in an 11½ inch concrete slab using a 7 inch tower.

The tower 804 is positioned within a frame and the shaft 802 is threaded into the second end 834 of the tower body 816. To thread the shaft 802 into the second end 834 of the tower body 816, the shaft 802 must be rotated in a predetermined direction such that the threads 870 on the rod portion 808 engage with the corresponding threads 871 on the inner surface of the tower body 816. By rotating the shaft 802, the shaft 802 may be raised or lowered relative to the tower 804. The rod portion 808 is rotated until the measurement indicator 815 corresponding to 1½ inches is aligned with the second end 834 of the tower body 816. By setting the rod portion 808 at the 1½ inch measurement indicator 815 (FIGS. 8B, 8C), or at the color strip (FIG. 8A), the platform 806 is positioned 1½ inches above the top of the tower body 816, which is 7 inches tall, for a total height from the grade or substrate of 8½ inches.

The interaction between the threads 870 of the rod portion 808 and the corresponding threads 871 of the tower body 816 is such that, absent rotation of the shaft 802, the shaft 802 is securely positioned within the tower body 816, thereby preventing inadvertent linear motion of the shaft 802 within the tower body 816. In some embodiments, the threads 871 are sized and shaped to provide resistance when engaged with the corresponding threads 871 of the tower body 816. In some embodiments, a set screw is used to secure the shaft 802 and prevent rotational motion.

After the shaft 802 has been rotated to the desired position, the electrical box is attached to the platform 806 and concrete is poured into the frame as described elsewhere herein.

The order in which the components of the support 800 are used can vary without departing from the scope of the present disclosure. For example, a user may attach the object to the platform 806 using the pilot hole, set the shaft 802 to the desired height, then attach the tower 804 to the grade or prepared substrate.

Referring to FIG. 9A, a support 900 comprises a shaft 902 and a tower 904. The shaft 902 comprises a platform 906 and a rod portion 908. The rod portion 908 comprises notches 972 that extend radially from an outer surface of the rod portion 908. According to one embodiment, the notches 972 surround the entire circumference of the rod portion 908. The tower 904 comprises a tower body 916 and a base 918, which is attached to a first end 932 of the tower body 916. The tower body 916 and base 918 can be substantially similar to those described above with reference to FIG. 3A. The tower body further comprises tabs 974 that are integrally formed to an inner surface of the tower body 916 and are preferably located near a second end 934 of the tower body 916. The shaft 902 is configured to be inserted into the second end 934 of the tower body 916 and releasably retained within the tower body 916 by an interaction between the notches 972 on the rod portion 908 and tabs 974 on the inner surface of the tower body 916. In one embodiment, the rod portion comprises measurement indicators 815 that are substantially similar to those described above with reference to FIG. 4A. In some embodiments, the rod portion 808 may comprises a color coding scheme substantially similar to the scheme described above with reference to FIG. 8A.

Figure 9B:
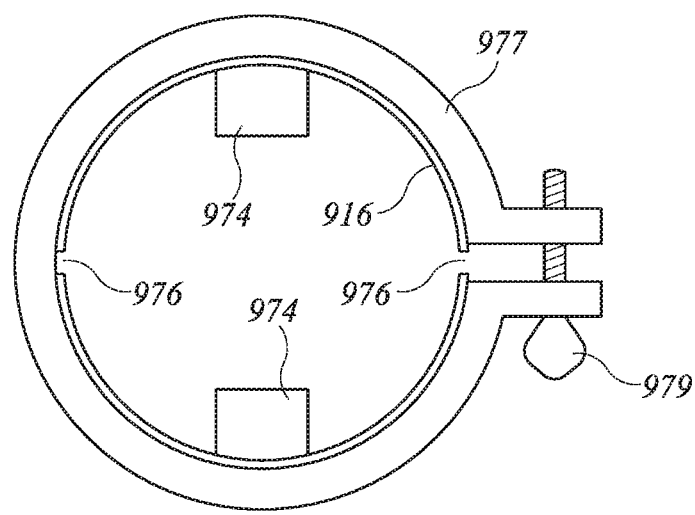
FIG. 9B depicts a top view of a clamp surrounding the tower portion of FIG. 9A.

FIG. 9B depicts a top view of the tower body 916 of FIG. 9A. The tower body 916 comprising the tabs 974, a clamp 977, and one or more slits 976. The clamp 977 comprises a tightening mechanism 979 configured to tighten and release the clamp 977. The clamp 977 preferably substantially surrounds the circumference of the tower body 916, but at a minimum is configured to apply pressure to opposing points along the circumference of the tower body 916. The clamp 977 may be permanently positioned near the second end 934 of the tower body 916, or the clamp 977, when loosened, may be free to slide along the tower body 916. The clamp 977 may be any suitable clamp, such as a quick-release clamp, a hose clamp, etc. The slits 976 are located along the tower body 916 and may extend the length of the tower body 916. In some embodiments, the slits 976 may begin at the second end 934 of tower body 916 and extend only partially down the length of the tower body 916. The slits 976 are configured to allow the tower body 916 to expand or flex when the clamp 977 is not secured.

Operation of the support 900 will now be described. As an example, the support 900 can be used in an application that requires suspending a 3 inch electrical box (not shown) in an 11½ inch concrete slab using a 7 inch tower.

The tower 904 is positioned within a frame and the rod portion 908 is inserted into the second end 934 of the tower body 916. As the rod portion 908 is inserted into the tower body 916, the notches 972 push on the tabs 974, causing the tower body 916 to expand or flex outwardly, allowing the notches 972 to pass the tabs 974. After each notch 972 passes the tabs 974, the tower body 916 resumes its shape such that the shaft 902 is loosely suspended by the tabs 974. The diameter or cross-sectional area of the rod portion 908 is larger than the distance separating the tabs 974, whereas the diameter or cross-sectional area of the rod portion 908 is smaller than the diameter of the tower body 916. Thus, the rod portion 908 will be easily received into the tower body 916 after passing the tabs 974. The rod portion 908 is inserted until the measurement indicator 915 corresponding to 1½ inches is aligned with the second end 934 of the tower body 916. By setting the rod portion 908 at the 1½ inch measurement indicator 915, the platform 906 is positioned 1½ inches above the top of the tower body 904, which is 7 inches tall, for a total height from the grade or substrate of 8½ inches.

When the shaft 902 is at the desired position, the clamp 977 may be tightened around the second end 934 of the tower body 916 using the tightening mechanism 979. This forces the tabs 974 securely between the notches 972 of the rod portion 908, thereby securing the shaft 902 to the tower 904.

In some embodiments, the rod portion 908 may comprise one or more notches 972. In some embodiments, the rod portion 908 may comprise 2, 3, 4, 5, 10, 20, or more notches 972, as desired to establish or set a desired height increment by which the shaft 902 can be adjusted. If a smaller increment is desired, more notches 972, spaced closer together, can be used. In some embodiments, the tower body 916 may comprise 1, 2, 3, 4 or more tabs 974. In this case, the process described above would occur at the same time for the number of tabs 974 interacting with a corresponding number of notches 972.

After the shaft 902 has been secured in the desired position, the electrical box is attached to the platform 906 and concrete is poured into the frame as described elsewhere herein.

The order in which the components of the support 900 are used can vary without departing from the scope of the present disclosure. For example, a user may attach the object to the platform 906 using the pilot hole, set the shaft 902 to the desired height, then attach the tower 904 to the grade or prepared substrate.

Figure 9C:
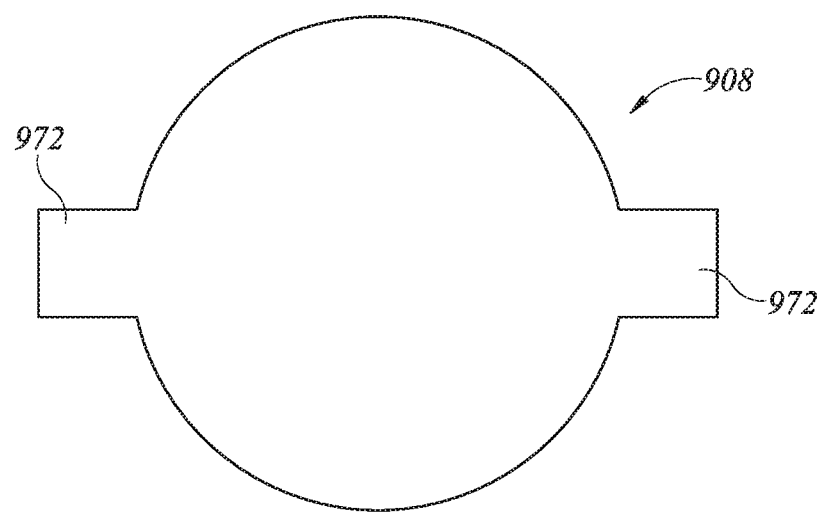
FIG. 9C depicts a bottom view of an embodiment of a rod portion.

FIG. 9C depicts a bottom view of an embodiment of the rod portion 908 of FIG. 9A used in the support 900. Notches 972 extend radially from opposite sides of the rod portion 908. According to this embodiment, the notches 972 do not substantially surround the circumference of the rod portion 908. In other respects, the rod portion 908 is similar to that of FIG. 9A.

Operation of the rod portion 908 according to FIG. 9C will now be described. Once the tower 904 is positioned and secured to a substrate, the rod portion 908 is inserted into the second end 934 of the tower body 916. To insert the rod portion 908, the rod portion 908 must be inserted such that the notches 972 are not aligned with the tabs 974. That is, the shaft 902 is inserted so that the portion of the rod portion 908 which does not include the notches 972 is axially or vertically aligned with the tabs 974. The shaft 902 may be freely raised and lowered in the tower body 916 when the notches 972 are not aligned with the tabs 974. The diameter or cross-sectional area of the rod portion 908 is smaller than the diameter of the tower body 916, so the rod portion 908 will be easily received into the tower body 916. The rod portion 908 is inserted until the desired measurement indicator 315 is aligned with the second end 334 of the tower body 316. The rod portion 908 and tower body 916 may then be rotated relative to each other to interlock the tabs 974 and the notches 972. The clamp 977 may then be tightened to prevent rotational and vertical motion of the shaft 902 and thereby securing the shaft 902 in the tower body 916 through a friction fit.

In some embodiments, the rod portion 908 according to FIG. 9C may comprise 1 or more sets of notches 972. In some embodiments, the rod portion 908 may comprise 2, 3, 4, 5, 10, 20, or more sets of notches 972, as desired to establish or set a desired height increment by which the shaft 902 can be adjusted. If a smaller increment is desired, more notches 972, spaced closer together, can be used. In some embodiments, the tower body 916 may comprise 1, 2, 3, 4 or more tabs 974. In this case, the process described above would occur at the same time for the number of tabs 974 interacting with a corresponding number of notches 972.

After the shaft 902 has been locked into the desired position, an electrical box (not shown), for example, can be connected to the platform 906 using the pilot hole (not shown). The electrical box may have a mounting hole or a screw hole (not shown) formed therein. The mounting hole in the electrical box is positioned over the pilot hole 310 in the shaft 302, and a screw, nail, or other attachment mechanism is inserted into the mounting hole and the pilot hole to attach the electrical box to the platform 906.

Referring to FIG. 10, a support 1000 comprises a shaft 1002 and a tower 1004. The shaft 1002 comprises a platform 1006 and a rod portion 1008. The rod portion 1008 is smooth and comprises measurement indicators 1015 that are substantially similar to those described above with reference to FIG. 4A. The tower 1004 comprises a tower body 1016, a base 1018, and a clamp 1077. The base 1018 is attached to a first end 1032 of the tower body 1016. The tower body 1016 and base 1018 can be substantially similar to those described above with reference to FIG. 3A. The clamp 1077 is preferably located near a second end 1034 of the tower body 1016 and is configured to substantially surround the rod portion 1008. The clamp 1077 may be substantially similar to the clamp described above with reference to FIG. 9B. The clamp 1077 may be integrally formed into the tower body 1016 or the clamp 1077 may be attached atop the second end 1034 of the tower body 1016. A skilled artisan will recognize that if the clamp 1077 is attached atop the second end 1034 of the tower body 1016, the height of the support 1000 would be determined by aligning the desired measurement indicator 1015 with the top of the clamp 1077.

Operation of the support 1000 will now be described. As an example, the support 1000 can be used in an application that requires suspending a 3 inch electrical box (not shown) in an 11½ inch concrete slab using a 7 inch tower.

The tower 1004 is positioned within a frame and the shaft 1002 is inserted into the second end 1034 in the tower body 1016. To insert the shaft 1002, the clamp 1077 must be loosened to allow the shaft 1002 to freely move up and down within the tower body 1016. The diameter or cross-sectional area of the rod portion 1008 is smaller than the diameter of the tower body 1016, so the rod portion 1008 will be easily received into the tower body 1016. The rod portion 1008 is raised or lowered until the measurement indicator 1015 corresponding to 1½ inches is aligned with the second end 1034 of the tower body 1016. By setting the rod portion 1008 at the 1½ inch measurement indicator 1015, the platform 1006 is positioned 1½ inches above the top of the tower body 1004, which is 7 inches tall, for a total height from the grade or substrate of 8½ inches.

When the shaft 1002 is at the desired position, the clamp 1077 is tightened around the rod portion 1008, preventing motion of the shaft 1002 relative to the tower 1004.

After the shaft 1002 has been inserted to the desired position, the electrical box is attached to the platform 1006 and concrete is poured into the frame as described elsewhere herein.

The order in which the components of the support 1000 are used can vary without departing from the scope of the present disclosure. For example, a user may set the shaft 1002 to the desired height, attach the object to the platform 1006 using the pilot hole, then attach the tower 1004 to the grade or prepared substrate.

Figure 11A:
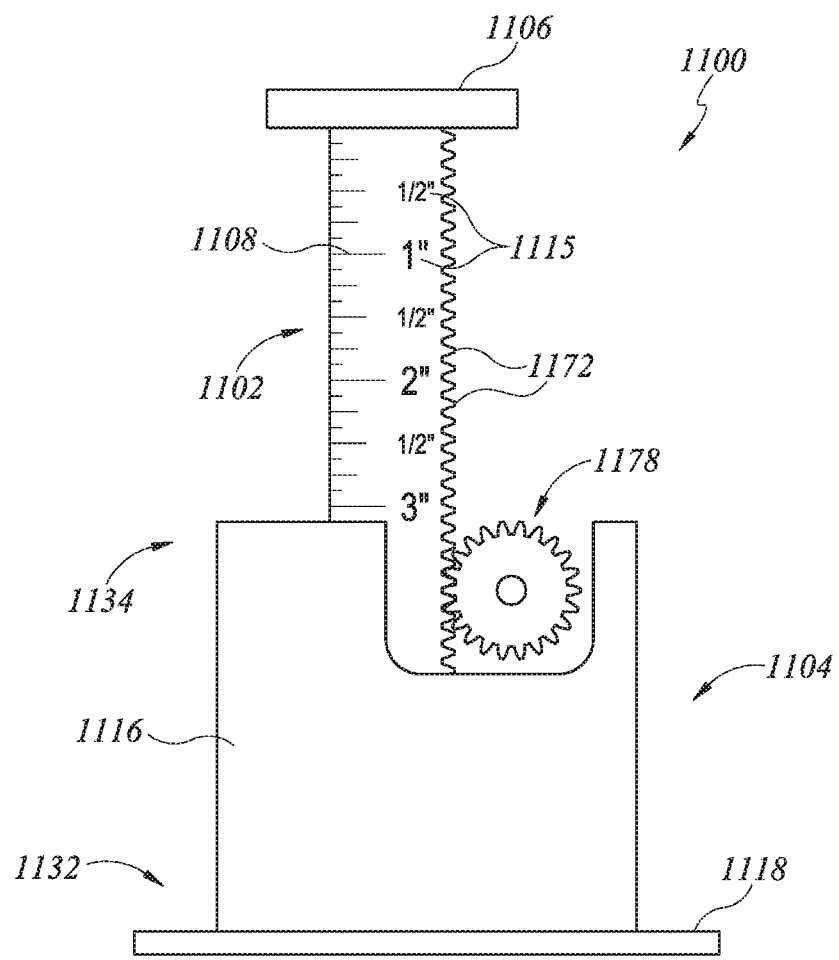
FIG. 11A depicts a partial cut-away view of a support having a rack and pinion design.

Referring to FIG. 11A, a support 1100 comprises a shaft 1102 and a tower 1104. The shaft 1102 comprises a platform 1106 and a rod portion 1108. The rod portion comprises teeth 1172 that run along the length of the rod portion 1108. The rod portion 1108 further comprises measurement indicators 1115 that are similar to those described above with reference to FIG. 4A. The tower 1104 comprises a tower body 1116, a base 1118, and a controller 1178. The base 1118 is attached to a first end 1132 of the tower body 1116. The controller 1178 is preferably located near a second end 1134 of the tower body. The tower body 1116 and base 1118 can be substantially similar to those described above with reference to FIG. 3A. The shaft 1102 and the tower 1104 may be designed as a single unit (i.e., the shaft 1102 cannot be completely removed from the tower body 1116).

Figure 11B:
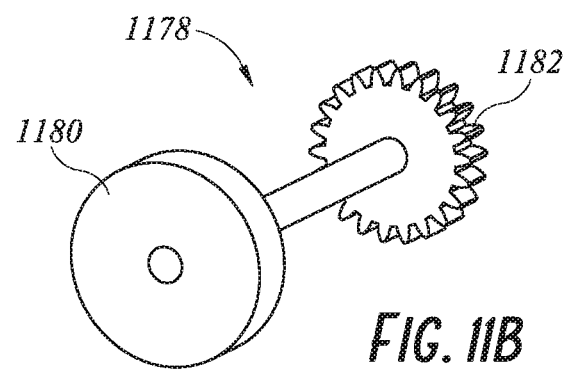
FIG. 11B depicts a perspective view of a circular gear and handle used in the embodiment of FIG. 11A.

Referring to FIG. 11B, the controller 1178 comprises a handle 1180 fixed to a circular gear 1182. The circular gear 1182 is configured to engage with the teeth 1172 that run along the length of the rod portion 1108. A locking pin (not shown) may be used to prevent the controller 1178 from rotating by inserting the locking pin between the circular gear 1182 and the teeth 1172 of the rod portion 1108.

Operation of the support 1100 will now be described. The support 1100 can be used in an application that requires suspending a 3 inch thick electrical box (not shown) in an 11½ inch concrete slab using a 7 inch tower 1104.

The tower 1104 is positioned within a frame and the shaft 1102 is raised or lowered to a desired height. To raise or lower the shaft 1102, the teeth 1172 of the rod portion 1108 must be engaged with the circular gear 1182 of the controller 1178. As the handle 1180 is rotated, the rotational motion of the controller 1178 is converted into linear motion of the shaft 1102. The diameter or cross-sectional area of the rod portion 1108 is smaller than the diameter of the tower body 1116, so the rod portion 1108 will easily move within the tower body 1116. The rod portion 1108 is raised or lowered via the controller 1178 until the measurement indicator 1115 corresponding to 1½ inches is aligned with the second end 1134 of the tower body 1016.

When the shaft 1102 is positioned at the desired position, the controller 1178 is locked with the locking pin, thereby preventing motion of the shaft 1102 relative to the tower 1104. The electrical box is then attached to the platform 1106 and concrete is poured into the frame as described elsewhere herein.

The order in which the components of the support 1100 are used can vary without departing from the scope of the present disclosure. For example, a user may adjust the shaft 1102 to the desired height, attach the object to the platform 1106 using the pilot hole, then attach the tower 1104 to the grade or prepared substrate.

Figure 12:
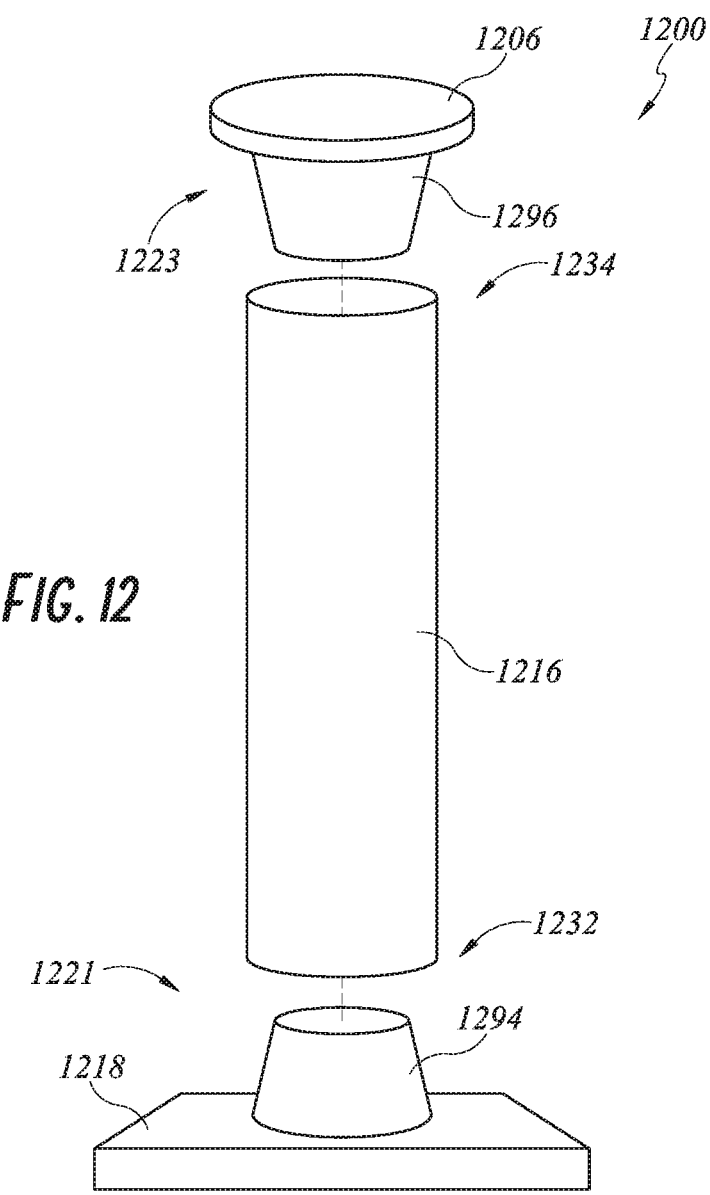
FIG. 12 depicts a perspective view of a dissembled embodiment of a support.

Referring to FIG. 12, a support 1200 comprises an upper section 1223, a lower section 1221, and a tower body 1216. The upper section 1223 comprises a platform 1206 and a platform plug 1296. The lower section 1221 comprises a base 1218 and a base plug 1294. The tower body 1216 comprises a hollow cylinder with a first end 1232 and a second end 1234. In one embodiment, the tower body 1216 is a pipe such as a PVC, ABS, copper, or any other desired type of pipe with a predetermined diameter and height. In some embodiments, the platform plug 1296 is a raised member having a cross sectional area that decreases as it extends away from the platform 1206 and is configured to securely fit into the second end 1234 of the tower body 1216. Likewise, the base plug 1294 may comprise a diameter that decreases as it extends away from the base 1218 and is configured to securely fit into the first end 1232 of the tower body 1216. In some embodiments, the platform plug 1296 and the base plug 1294 may be cylindrical, rectangular, triangular, trapezoidal, etc. The platform plug 1296 and the base plug 1294 may be integrally formed or molded with the platform 1206 and the base 1218 respectively. In some embodiments, an inner diameter of the tower body 1216 is equal to the diameter of the base plug 1294 and the platform plug 1296 such that, when assembled, the tower body 1216 is friction fit to the base 1218 and the platform 1206. The base 1218 can be substantially similar to the base described above with reference to FIG. 3A.

Operation of the support 1200 will now be described. The support 1200 can be used in an application that requires suspending a 3 inch thick electrical box (not shown) in an 11½ inch concrete slab. In this example, the support 1200 will have a 1 inch high base 1218 and a 1 inch high platform 1206. Accordingly, the tower body 1216 needs to 6½ inches to accommodate for the base 1218, the platform 1206, and the electrical box. In some embodiments, a pre-cut piece of pipe is used as the tower body 1216. In some embodiments a pipe is cut to the needed length on site.

The lower section 1221 is secured within a frame, first end 1232 the tower body 1216 is forced onto the base plug 1294 such that the first end 1232 contacts the base 1218. The diameter or cross-sectional area nearest the base 1218 of the base plug 1294 is slightly larger than the diameter of the first end 1232 of the tower body 1216, and the diameter or cross-sectional area farthest from the base 1218 of the base plug 1294 is slightly smaller than the diameter of the first end 1232 of the tower body 1216. Thus, the fit between the base plug 1294 and the first end 1232 of the tower body 1216 will become tighter as the tower body 1216 is forced onto the base plug 1294. In this manner, the tower body 1216 is friction fit onto the lower section 1221. The upper section 1223 is then put in position by forcing the platform plug 1296 into the second end 1234 of the tower body 1216, such that the second end 1234 contacts the platform 1206. The diameter or cross-sectional area of the platform plug 1296 nearest the platform 1218 is slightly larger than the diameter of the second end 1234 of the tower body 1216, and the diameter or cross-sectional area farthest from the platform 1218 of the platform plug 1296 is slightly smaller than the diameter of the second end 1234 of the tower body 1216. Thus, the fit between the platform plug 1296 and the second end 1234 of the tower body 1216 will become tighter as the platform plug 1296 is forced into the second end 1234 of the tower body 1216. In some embodiments, the platform plug 1296 and the base plug 1294 are cylindrical and configured to have a diameter equal to the inner diameter of the tower body 1216. In this manner, the tower body 1216 is friction fit onto the upper section 1223. By pre-cutting the tower body to 6½ inches and then assembling the support 1200 using a 1 inch platform 1206 and a 1 inch base 1218, the total height from the grade or substrate is 8½ inches. The platform 1206 and the base 1218 can be of varying heights, 1 inch is exemplary only.

After the support 1200 has been assembled, the electrical box is attached to the platform 1206 and concrete is poured into the frame as described elsewhere herein.

The order in which the components of the support 1200 are used can vary without departing from the scope of the present disclosure. For example, a user may fit the upper section 1223 onto the tower body 1216, then fit the lower section 1221 onto the tower body 1216, and then attach the base 1218 to the grade or prepared substrate.

Figure 13:
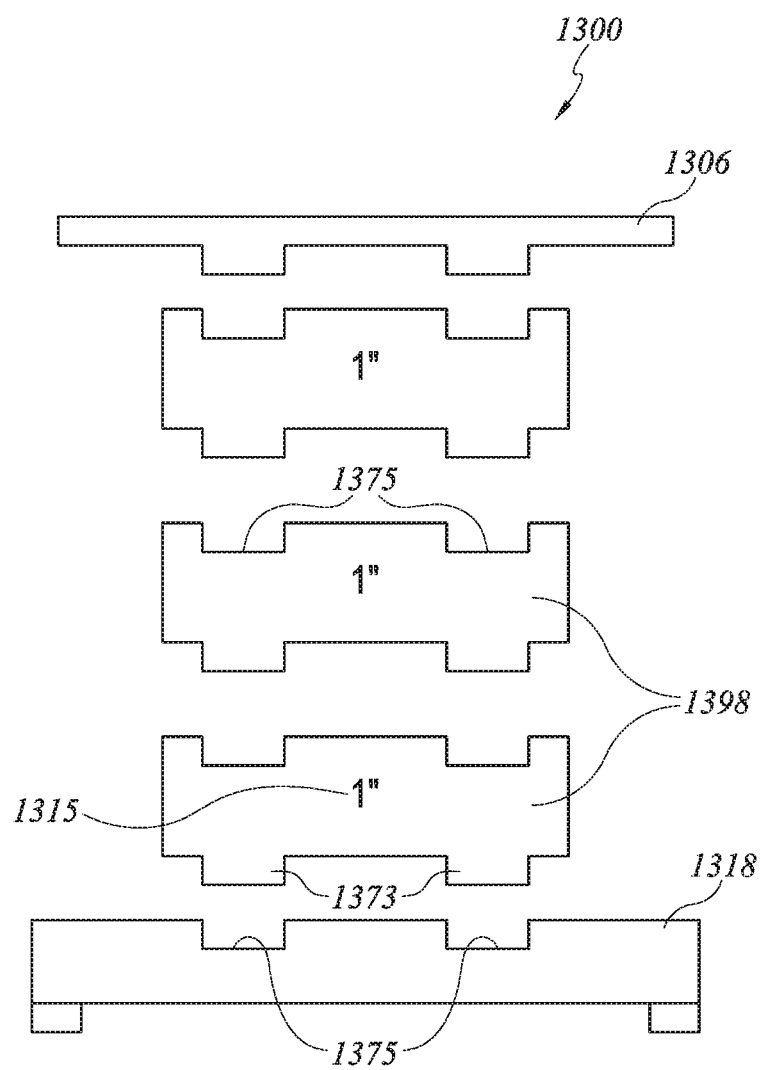
FIG. 13 depicts a perspective view of a dissembled embodiment of a support.

Referring now to FIG. 13, a support 1300 comprises a platform 1306, a base 1318, and a plurality of modular stacks 1398. The platform 1306 comprises one or more tabs 1373 that extend from a bottom of the platform 1306. The base 1318 comprises one or more recesses 1375 formed in the upper portion of the base 1318. Each modular stack 1398 comprises one or more tabs 1373 and one or more recesses 1375 arranged on opposing sides of the modular stacks 1398. The tabs 1373 are configured to securely fit, snap, or twist into the recesses 1375. The platform 1306, the base 1318, and the modular stacks 1398 are manufactured to pre-determined heights. For instance, each modular stack 1398 may have a height of 1 inch. In some embodiments, the modular stacks 1398 have varying heights (e.g., ½ inch, 1 inch, 2 inches, 5 inches, etc.). Modular stacks 1398 of varying heights can be used to create a support 1300 having a desired height.

Operation of the support 1300 will now be described. As an example, the support 1300 can be used in an application that requires suspending a 3 inch electrical box (not shown) in an 11½ inch concrete slab. FIG. 13 depicts modular stacks 1398, each with a height of 1 inch, however, for exemplary purposes, the present example uses modular stacks 1398 with pre-determined heights of ½ inch, 1 inch, and 5 inches. The platform 1306 and base 1318 will each have a predetermined height of 1 inch.

The base 1318 is positioned within a frame and modular stacks 1398 are stacked onto the base 1318. To securely stack the modular stacks 1398 onto the base 1318, the tabs 1373 of a modular stack 1398 must be inserted into the recesses 1375 of the base 1318. The tabs 1373 another modular stack 1398 is then inserted into the recesses 1375 of the preceding modular stack and in this manner the support 1300 is assembled. The area occupied by the tabs 1373 is slightly less than that of the recesses 1375, so the tabs 1373 will be received into the recesses 1375, forming a friction fit. In the present example, a 5 inch modular stack, a 1 inch modular stack, and a ½ inch modular stack are stacked onto the base 1318 in the manner described above. The platform 1306 is then positioned on top, bringing the total height of the support 1300 to 8½ inches. A skilled artisan will appreciate that the tabs 1373 and the recesses 1375 may be configured in several different shapes. (e.g., rectangular, cylindrical, semi-circular, triangular, etc.). Further, a skilled artisan will recognize that it is arbitrary which side of the modular stacks 1398 the recesses 1375 and tabs 1373 are positioned on, so long as they are configured to attach to the platform 1306 and the base 1318 in an appropriate manner.

In some embodiments, the support 1300 may comprise 1 or more sets of modular stacks 1398. In some embodiments, the support 1300 may comprise 2, 3, 4, 5, 10, 20, or more sets of modular stacks 1398 of varying heights, as desired to establish or set a desired height increment by which the support 1300 can be adjusted. In some embodiments, the support 1300 may comprise 1 or more sets of tabs 1373 on each modular stack 1398. In some embodiments, the support 1300 may comprise 2, 3, 4, 5, or more tabs per modular stack 1398. The skilled artisan will recognize that for each set of tabs 1373 there must be an equal number of recesses 1375 to receive the tabs 1373.

After the support 1300 has been assembled, the electrical box is attached to the platform 1306 and concrete is poured into the frame as described elsewhere herein.

The order in which the components of the support 1300 are used can vary without departing from the scope of the present disclosure. For example, the support 1300 may be assembled to a desired height, and then the base 1318 may be attached to the grade or prepared substrate.

Figure 14:
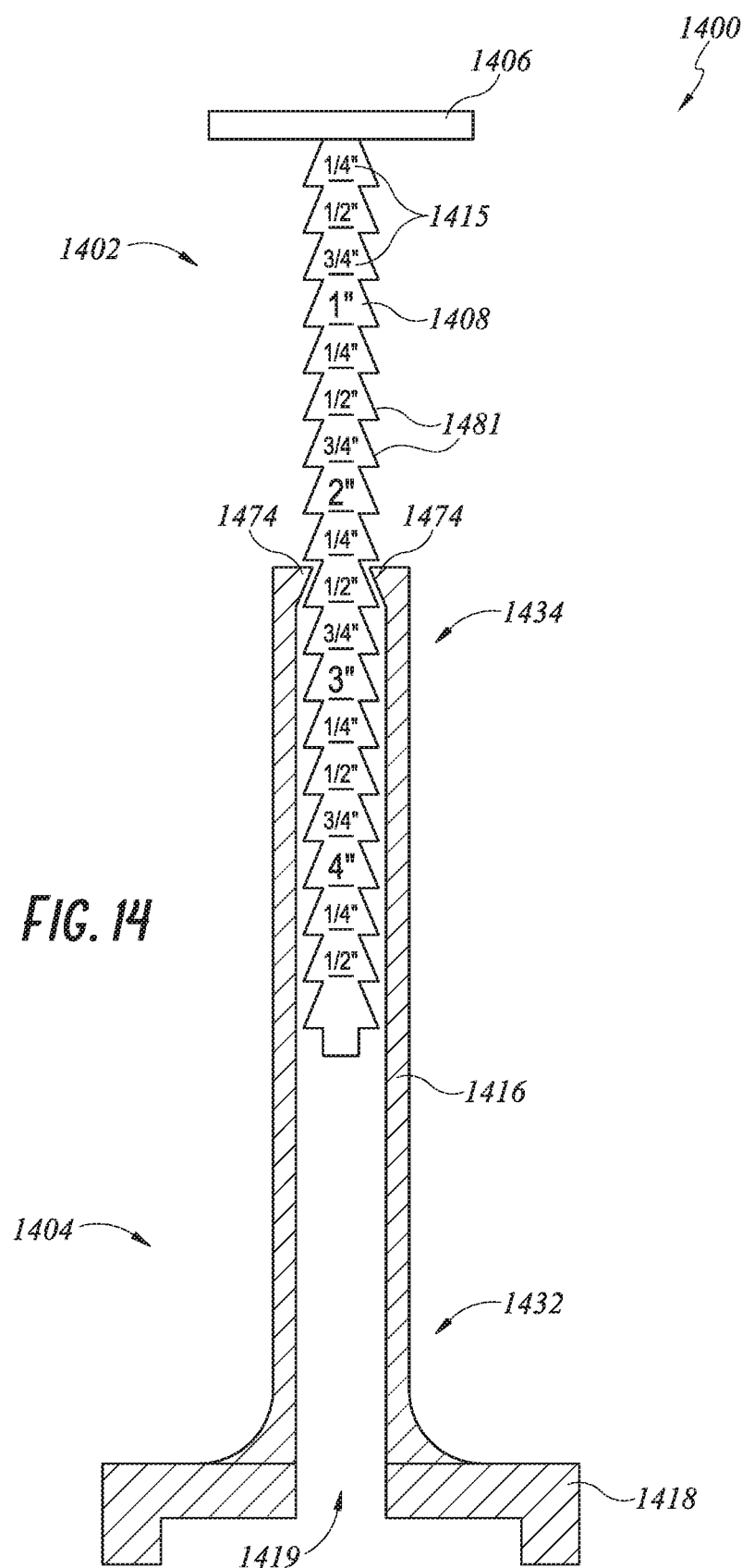
FIG. 14 depicts a cross section of an embodiment of a support.

Referring to FIG. 14, a support 1400 comprises a shaft 1402 and a tower 1404. The shaft 1402 comprises a platform 1406 and a rod portion 1408. The rod portion 1408 comprises protrusions 1481 that extend radially from an outer surface of the rod portion 1408 and substantially surround the circumference of the rod portion 1408. In some embodiments, the protrusions 1481 circumferentially surround the rod portion 1408. The tower 1404 comprises a tower body 1416 and a base 1418, which is attached to a first end 1432 of the tower body 1416. The tower body 1416 further comprises tabs 1474 that are fixed to an inner surface of the tower body 916 and are preferably located near a second end 1434 of the tower body 1416. According to one embodiment, the platform 1406 is configured to be removed from the rod portion 1408. For instance, the rod portion 1408 may comprise a threaded top (not shown) that may be screwed into a threaded recess (not shown) in the platform 1406. According to one embodiment, the tower body 1416 may be detached from and reattached to the base 1418. This may be accomplished by any suitable means (e.g., clips, threads, fasteners). The rod portion 1408 with the platform 1406 removed may be inserted into the first end of the tower body 1432. In some embodiments, the base 1418 comprises a hole 1419 such that the rod portion 1408 with the platform 1406 removed may be inserted through the hole 1419 in the base 1418 and into the tower body 1416. With the exception of hole 1419 and the capability to detach from one another, the tower body 1416 and base 1418 can be substantially similar to those described above with reference to FIG. 3A. The shaft 1402 is configured to be adjustably retained within the tower body 1416 by an interaction between the protrusions 1481 on the rod portion 1408 and tabs 1474 on the inner surface of the tower body 1416. The protrusions 1481 and tabs 1474 are configured to allow the rod portion 1408 unidirectional travel through the tower body 1416. (e.g., from the first end 1432 of the tower body 1416 through the second end 1434). In one embodiment, the rod portion 1408 comprises measurement indicators 1415 substantially similar to those described above with reference to FIG. 4A. In some embodiments, the rod portion 1408 may comprise a color coding scheme similar to the embodiment described above with reference to FIG. 8A.

Operation of the support 1400 will now be described. As an example, the support 1400 can be used in an application that requires suspending a 3 inch electrical box (not shown) in an 11½ inch concrete slab using a 7 inch tower. In this example, the rod portion 1408 begins positioned inside the tower body 1416 with the platform 1406 proximate the second end 1434 of the tower body 1416.

The tower 1404 is positioned within a frame and the shaft 1402 is withdrawn from the tower body 316 by pulling on the platform 1406. As the rod portion 1408 is withdrawn from the tower body 1416, the protrusions 1481 push on the tabs 1474, causing the tower body 1416 and/or the tabs 1474 to expand or flex outwardly, allowing the protrusions 1481 to pass the tabs 1474. After each protrusion 1481 passes the tabs 1474, the tower body 1416 and/or the tabs 1474 resumes its shape, such that the shaft 1402 is prevented from reentry into the tower body 1416 by the tabs 1474. The diameter or cross-sectional area of the rod portion 1408 is larger than the distance separating the tabs 1474, whereas the diameter or cross-sectional area of the rod portion 1408 is smaller than the diameter of the tower body 1416, so the rod portion 1408 will be easily received into the tower body 1416, as described in greater detail below.

If the shaft 1402 is withdrawn past the desired height, the shaft 1408 may be completely withdrawn from the tower body 1416. The platform 1406 may then be removed and the rod portion 1408 may be inserted through the hole 1419 (if the base is not yet attached to the substrate) or through the first end 1432 of the detached tower body 1416, if capable. Once the rod portion 1408 is reinserted into the tower body 1416, the platform 1406 is reattached to the rod portion 1408. The rod portion 1408 is withdrawn until the measurement indicator 1415 corresponding to 1½ inches is aligned with the second end 1434 of the tower body 1416. By setting the rod portion 1408 at the 1½ inch measurement indicator 1415, the platform 1406 is positioned 1½ inches above the top of the tower body 1404, which is 7 inches tall, for a total height from the grade or substrate of 8½ inches.

In some embodiments, the rod portion 1408 may comprise 1 or more sets of protrusions 1481. In some embodiments, the rod portion 1408 may comprise 2, 3, 4, 5, 10, 20, or more sets of protrusions 1481, as desired to establish or set a desired height increment by which the shaft 1402 can be adjusted. If a smaller increment is desired, more protrusions 1481, spaced closer together, can be used. In some embodiments, the tower body 1416 may comprise 1, 2, 3, 4 or more tabs 1474. In this case, the process described above would occur at the same time for the number of tabs 1474 interacting with a corresponding number of protrusions 1481.

After the shaft 1402 has been withdrawn to the desired position, the electrical box is attached to the platform 1406 and concrete is poured into the frame as described elsewhere herein.

The order in which the components of the support 1400 are used can vary without departing from the scope of the present disclosure. For example, a user may set the shaft 1402 to the desired height, attach the object to the platform 1406 using the pilot hole, then attach the tower 1404 to the grade or prepared substrate.

The various embodiments of the supports, methods, and systems described above provide a means to better position embeds for embedding in concrete. Of course, it is to be understood that not necessarily all objects or advantages may be achieved in accordance with any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

The foregoing description and claims may refer to elements or features as being "connected," "coupled," or "attached" together. As used herein, unless expressly stated otherwise, "connected" "coupled" and "attached" can mean that one element/feature is directly or indirectly connected to another element/feature, and not necessarily mechanically, or that two features are not necessarily discreet components, such as being integrally formed from a single cast, mold, and the like. Although the various schematics shown in the Figures depict example arrangements of elements and components, additional intervening elements, devices, features, or components may be present in an actual embodiment (assuming that the functionality of the depicted circuits is not adversely affected).

Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. It is to be understood that the implementations are not limited to the precise configuration and components illustrated above. Thus, it is intended that the scope of the present invention herein disclosed should not be limited by the particular disclosed embodiments described above.

What is claimed is:

1. A support device comprising:
    a shaft, the shaft comprising:
        a rod;
        a platform attached to a first end of the rod;
        a first engagement mechanism disposed along at least a portion of the rod, the first engagement mechanism being discontinuous around an external surface of the shaft;
    a tower comprising:
        an interior surface, the interior surface surrounding an opening in a first end of the tower, the opening configured to receive the rod, wherein the interior surface comprises a second engagement mechanism formed on at least a portion of the interior surface and adapted to engage the first engagement mechanism; and
        a base connected to a second end of the tower, the base comprising a plurality of legs extending radially from a central axis of the tower, the legs being formed having throughholes therein; and
    an attachment plate, the attachment plate having an attachment mechanism configured to receive a portion of the base, the attachment plate comprising attachment holes.

2. The support device of claim 1, wherein the tower further comprises:
    a securing element configured to releasably secure the rod within the tower.

3. The support device of claim 1, wherein the first engagement mechanism is formed radially around an outer surface of the rod.

4. The device according to claim 1, wherein the platform has a pilot hole formed therein.

5. The support device of claim 1, wherein the tower comprises a retention element disposed on an exterior of the tower.

6. The support device of claim 1, wherein the first engagement mechanism is configured to rotatably engage the second engagement mechanism.

7. The support device of claim 1, wherein the shaft further comprises a plurality of measurement indicators thereon, the measurement indicators indicating a distance from a second end of the tower to a top surface of the platform.

8. The support device of claim 1, wherein the attachment holes are larger than the throughholes in the legs of the base.

9. A method of supporting an object comprising:
    placing a support device within a form, the support device comprising:
        a shaft, the shaft comprising:
            a rod;
            a platform attached to a first end of the rod;
            a first engagement mechanism disposed along at least a portion of the rod;
        a tower having an interior surface, the interior surface surrounding an opening in a first end of the tower, the opening configured to receive the rod, wherein the interior surface comprises a second engagement mechanism formed on at least a portion of the interior surface and adapted to engage the first engagement mechanism;
    inserting the shaft into the opening in the first end of the tower; rotating the shaft to engage the first engagement mechanism with the second engagement mechanism;
    attaching an object to the platform; and
    pouring concrete into the form around the support device, thereby embedding the object in the concrete at the predetermined height.

10. The method of claim 9 further comprising adjusting the support device to a desired height using a plurality of measurement indicators located on the shaft, the measurement indicators indicating the distance from a second end of the tower to a top surface of the platform.

11. The method of claim 9 further comprising retaining the tower in the concrete using a retention element, the retention element disposed on an exterior of the tower.

12. The method of claim 9, wherein the tower further comprises a base connected to a second end of the tower, the base comprising a plurality of legs extending radially from a central axis of the tower, the legs being formed having throughholes therein.

13. The method of claim 12 further comprising attaching the base to an attachment plate, the attachment plate comprising attachment holes that are larger than the throughholes, the attachment plate configured to be attached to a substrate by inserting an attachment mechanism through the attachment holes and into the substrate.

14. A support device comprising:
    a shaft, the shaft comprising:
        a rod having a first diameter;
        a platform attached to a first end of the rod, the platform having a pilot hole formed therein;
        at least one locking groove disposed along at least a portion of the rod, wherein the at least one locking groove has a second diameter, which is larger than the first diameter; and
    a tower comprising:
        a tower portion having a first end and a second end, the tower portion having an interior surface forming an opening in the first end, the opening configured to receive the shaft, wherein the interior surface comprises at least one locking member disposed on the interior surface, the at least one locking member configured to engage the at least one locking groove, respectively;
        a base connected to the second end of the tower portion, the base comprising a plurality of legs extending radially from a center of the tower portion; and
        a plurality of feet disposed on the plurality of legs.

15. The support device of claim 14, wherein the at least one locking groove is configured to rotatably receive the at least one locking member, respectively, to releasably lock the shaft in position within the opening.

* * * * *